United States Patent [19]
Nonoyama et al.

[11] Patent Number: 5,309,731
[45] Date of Patent: May 10, 1994

[54] AIR CONDITIONING APPARATUS

[75] Inventors: Hiroshi Nonoyama, Toyota; Koichi Ban, Toukai; Tadashi Suzuki, Toyota; Hikaru Sugi, Nagoya; Takahisa Suzuki, Kariya; Keita Honda, Okazaki; Kenichi Fujiwara, Kariya, all of Japan

[73] Assignee: Nippondenso Co., Ltd., Kariya, Japan

[21] Appl. No.: 997,364

[22] Filed: Dec. 28, 1992

[30] Foreign Application Priority Data

Dec. 27, 1991 [JP] Japan ................................. 3-345974
May 29, 1992 [JP] Japan ................................. 4-139380
Oct. 28, 1992 [JP] Japan ................................. 4-290023

[51] Int. Cl.$^5$ ............................................. B60H 1/32
[52] U.S. Cl. ................................. 62/244; 62/324.1
[58] Field of Search ............... 62/244, 324.1, 324.5

[56] References Cited

U.S. PATENT DOCUMENTS

| | | | |
|---|---|---|---|
| 3,779,031 | 12/1973 | Akiyama et al. | 62/324.1 X |
| 4,482,009 | 11/1984 | Nishimura et al. | 62/244 X |
| 4,667,479 | 5/1987 | Doctor | 62/324.5 X |
| 5,105,629 | 4/1992 | Parris et al. | 62/324.5 X |

FOREIGN PATENT DOCUMENTS 60-8105 1/1985 Japan.

Primary Examiner—William E. Tapolcai
Attorney, Agent, or Firm—Cushman, Darby & Cushman

[57] ABSTRACT

An air conditioning apparatus for an electric car capable of preventing condensation from forming on windshields, while decreasing electric power consumption. A duct forms therein a first passageway connecting an inside air inlet 8 with a lower outlet (foot outlet) 10 for discharging an air flow toward a lower part of a passenger in a cabin, and a second passageway for connecting an outside air inlet 11 with a defroster outlet 12 for discharging an air flow toward an inside surface of a windshield. A heat exchanger(s) is (are) arranged in the duct to make contact with the flow of air in the first and second passageways so as to heat the flows of air therein. The inside air after being heated by the heat exchanger is discharged from the lower outlet 10 to the cabin, while the outside air after heating is discharged from the defroster outlet 12 toward the windshield.

13 Claims, 23 Drawing Sheets

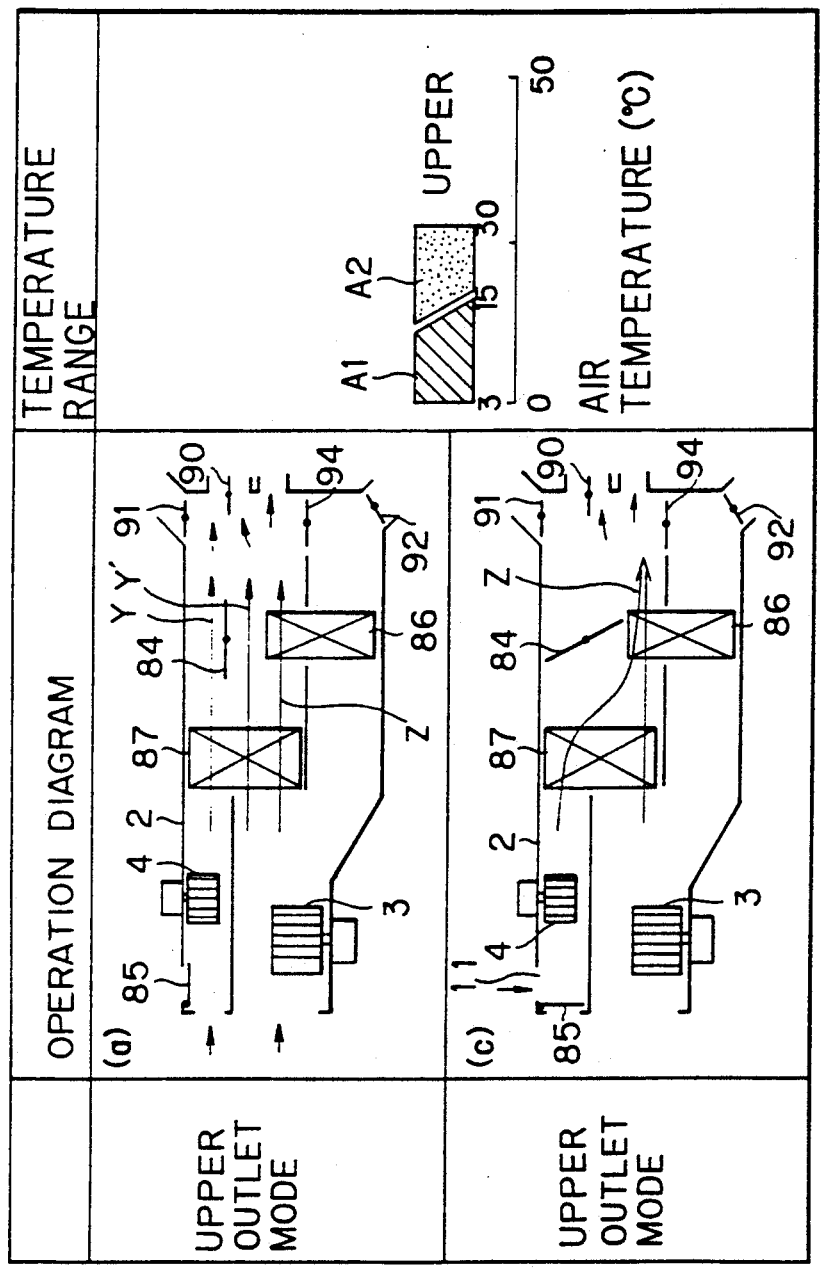

Fig.11B

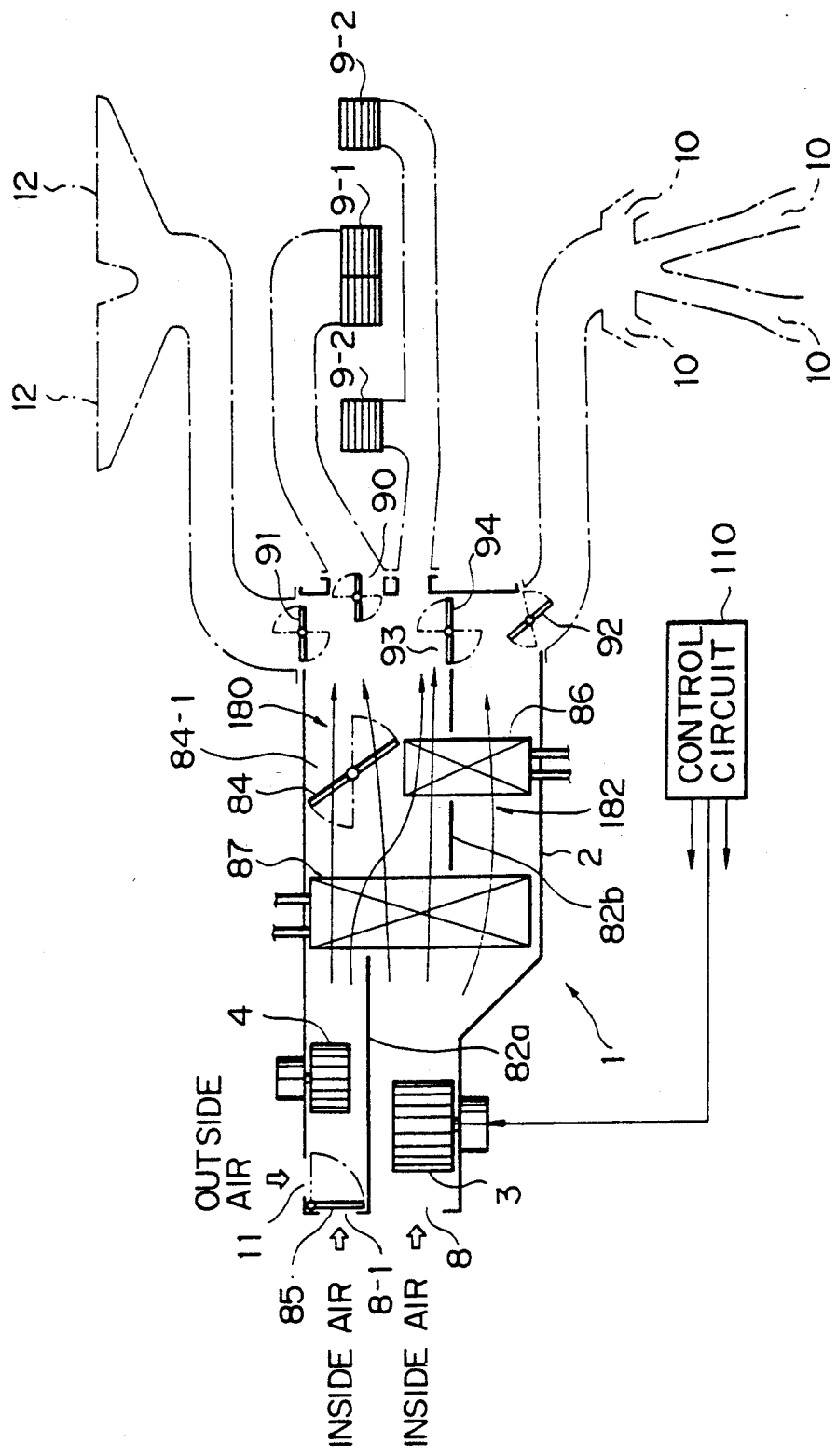

AIR CONDITIONING APPARATUS

BACKGROUND OF THE INVENTION

1. Field of the Invention

The present invention relates to an air conditioning apparatus for a vehicle, such as an electric car.

2. Description of Related Art

Known in the prior art is an air conditioning apparatus for a vehicle having an air duct that has a first end for the introduction of outside air or recirculated air from a cabin, and a second end opened to the cabin at various locations. A fan is arranged in the duct for obtaining a forced flow of air discharged into the cabin. A refrigerating circuit is provided that is basically constructed of a compressor, an inside heat exchanger arranged in the duct, a pressure reducer, an outside heat exchanger located outside of the duct, and an accumulator. A switching means is provided for switching between a position where a flow of the refrigerant from the compressor is obtained from the outside heat exchanger acting as a condenser, to the pressure reducer, and to the inner heat exchanger acting as an evaporator for a cooling operation of the air in the duct, and a position where a flow of the refrigerant from the compressor is obtained from the inside heat exchanger acting as a condenser, to the pressure reducer, and to the outside heat exchanger acting as an evaporator for a heating operation of the air in the duct.

In such type of cooling apparatus, there has been a strong need to reduce the consumption of power at the compressor. In particular, in case of an electric car, power consumption at the compressor significantly affects the running distance per recharging battery process. In order to save electric power consumed at the heat exchanger, it is preferable to increase the amount of inner recirculated air introduced into the duct, which effectively reduces the load during a heating operation. However, employment of the inner recirculating mode can increase the percent of carbon dioxide in the cabin generated by the respiration of passengers. Thus, it is necessary that a certain amount of outside air be drawn into the duct for air conditioning the cabin. Thus, it is strongly advisable to have as much recirculated air from the cabin for air conditioning as possible, while the amount of outside air introduced be as small as possible.

However, recirculation of the inner air causes condensation to form on the windshield (hereinafter referred to as fogging or clouding) during a heating operation,. For de-fogging, the introduction of an amount of outside air is necessary, thereby resulting in an increased consumption of electric energy.

SUMMARY OF THE INVENTION

An object of the present invention is to provide a heating system capable of preventing the formation of condensation on a windshield, while minimizing the consumption of energy.

According to the present invention, an air conditioning apparatus is provided for a vehicle having a passenger cabin and a windshield and comprising an air duct, which has, at its inlet side, an inside air inlet for the introduction of air from the cabin and an outside air inlet for the introduction of air from the atmosphere, and has, at its outlet side, a defroster outlet for discharging the air flow toward the windshield and a lower outlet for discharging the air flow toward the lower portions of the passenger;

means for generating forced flows of air in the duct from the inlets to the outlets;

heat exchanging means arranged in the duct for obtaining a heat exchange between a refrigerant in the heat exchanging means and the air flow in the duct;

compression means for compressing the refrigerant, and;

means cooperating with said heat exchanging means and compression means for constructing a refrigerating cycle so that the refrigerant is introduced at a high temperature into the heat exchanging means for heating the air which flows in the duct;

said air duct being divided into a first air passageway for connecting the inside air inlet to the lower outlet and a second air passageway for channeling the outside air into the defroster outlet;

said heat exchanging means being divided into a first section in contact with the air flow in the first air passageway, wherein the compressed refrigerant from the compression means is subjected to a heat exchange with the air flow in the first air passageway to cool the refrigerant, and a second section located downstream from the first section in the direction of the flow of the refrigerant in the refrigerant cycle; the second section being in contact with the air flow in the second air passageway, wherein the refrigerant from the first section is subjected to a heat exchange with the air flow in the second air passageway to additionally cool the refrigerant.

BRIEF DESCRIPTION OF ATTACHED DRAWINGS

FIGS. 11A and 11B are diagrams illustrating operations of the embodiment at various modes in FIG. 8.

Figure 8:
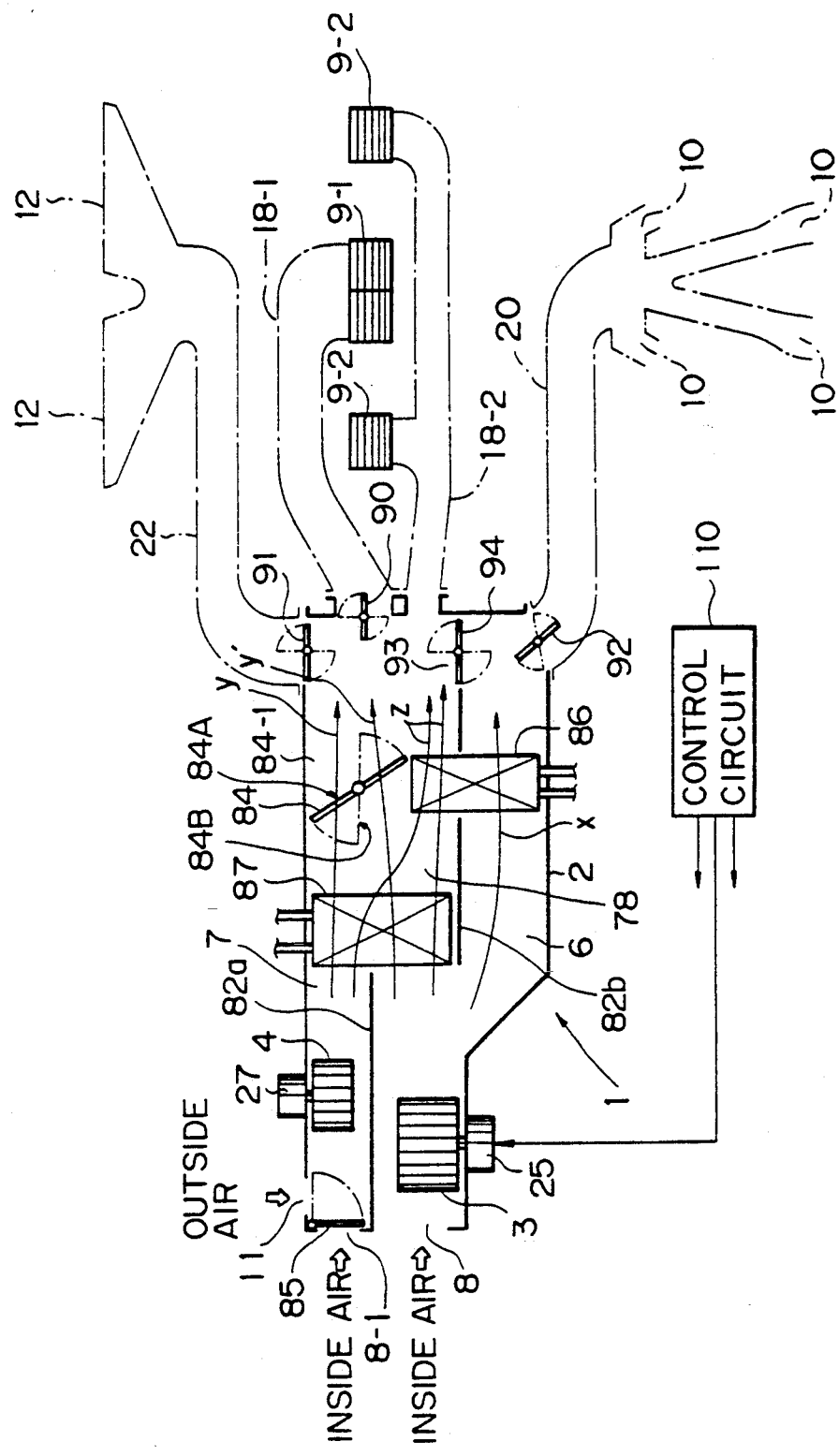
FIG. 8 shows a schematic view of the 7th embodiment of an air conditioning apparatus according to the present invention.
Figure 12A:
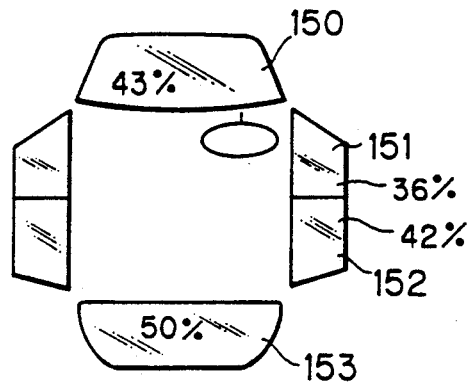
Figure 12B:
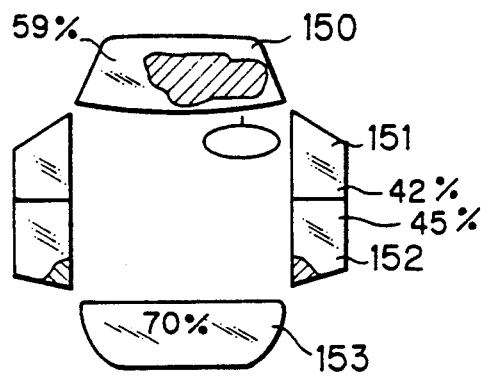
Figure 12C:
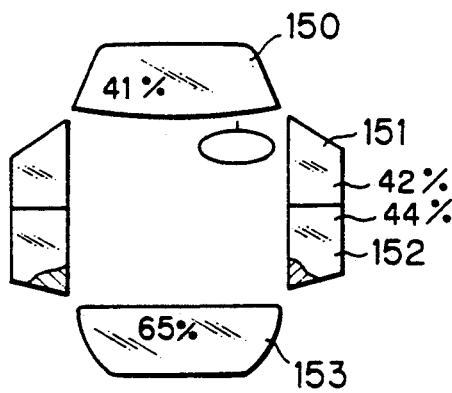

FIGS. 12-(A) to (C) illustrate a de-fogging operation in the embodiment in FIG. 8 during a heating operation.

Figure 13:
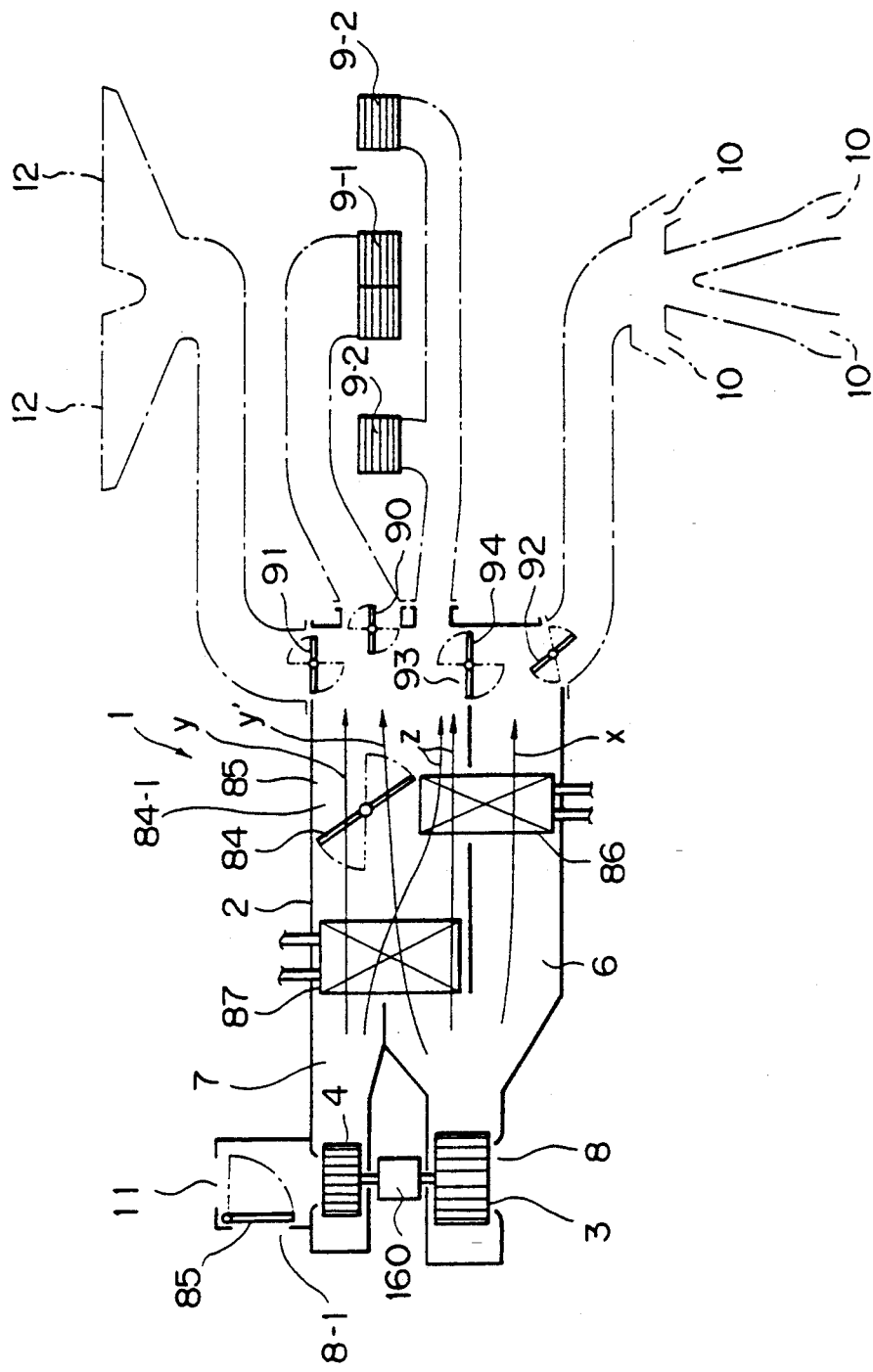
Figure 14:
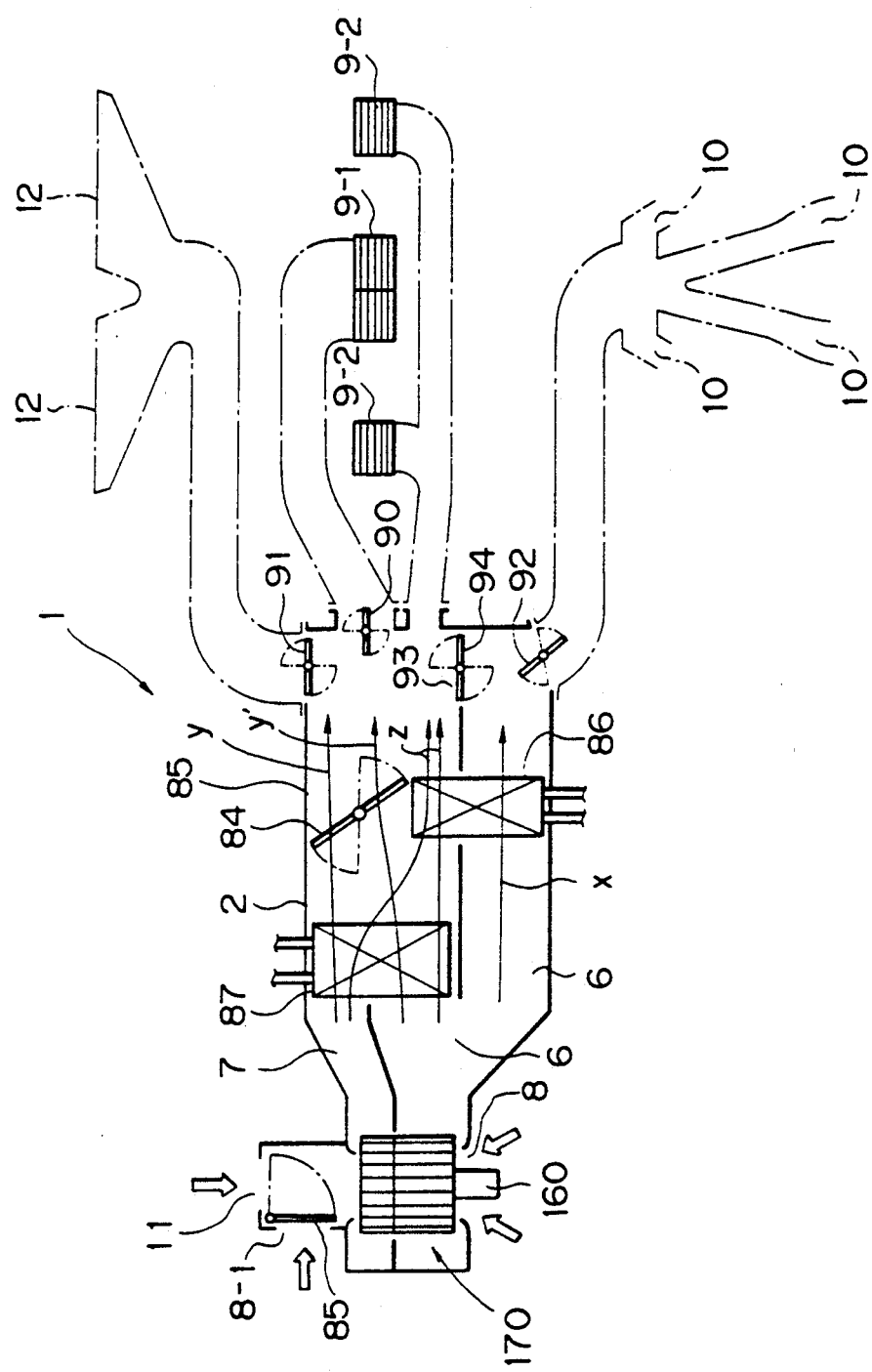

FIGS. 13 and 14 are similar to FIG. 8, but schematically show the 8th and 9th embodiments, respectively.

FIG. 15 shows the 10th embodiment of an air conditioning apparatus according to the present invention such that two flow, layers are obtained.

Figure 11B:
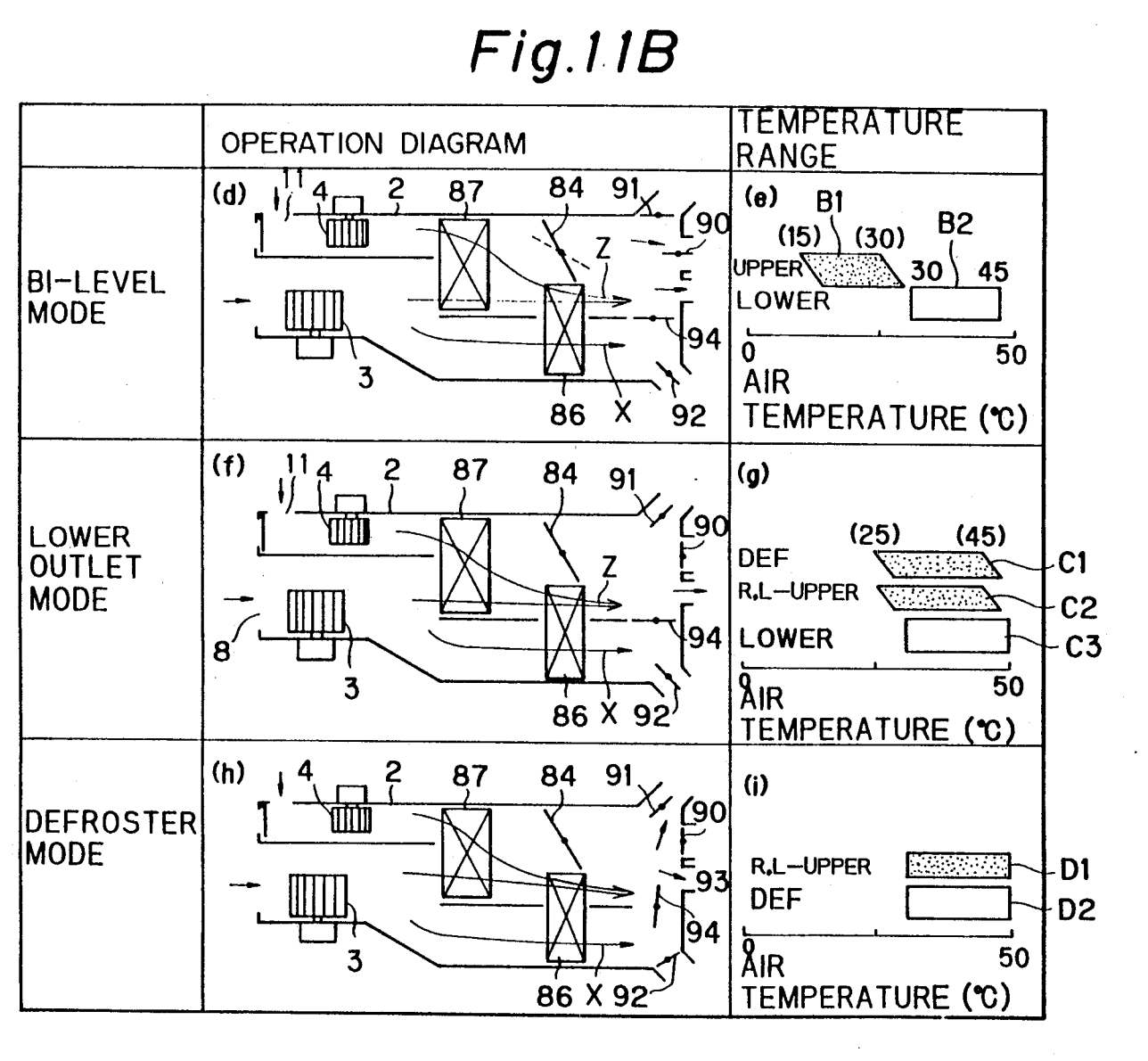
Figure 16A:
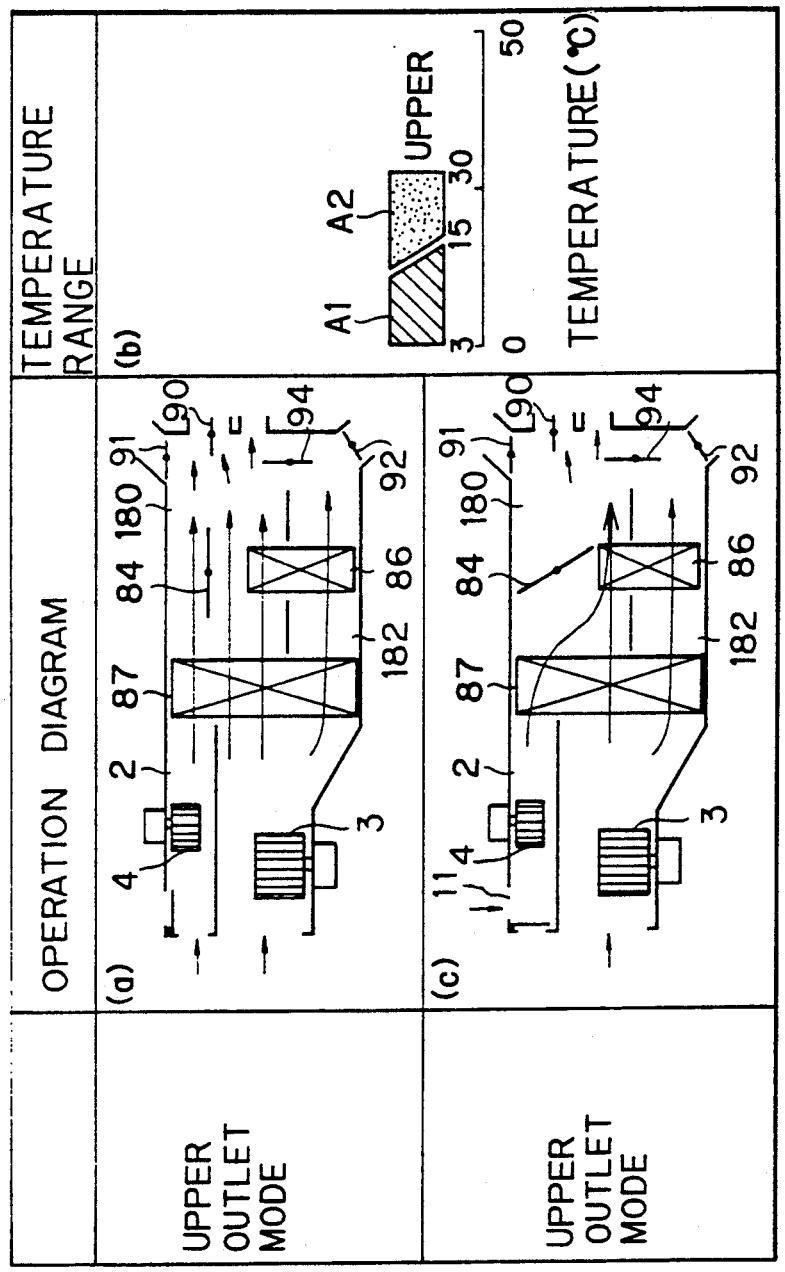
Figure 16B:
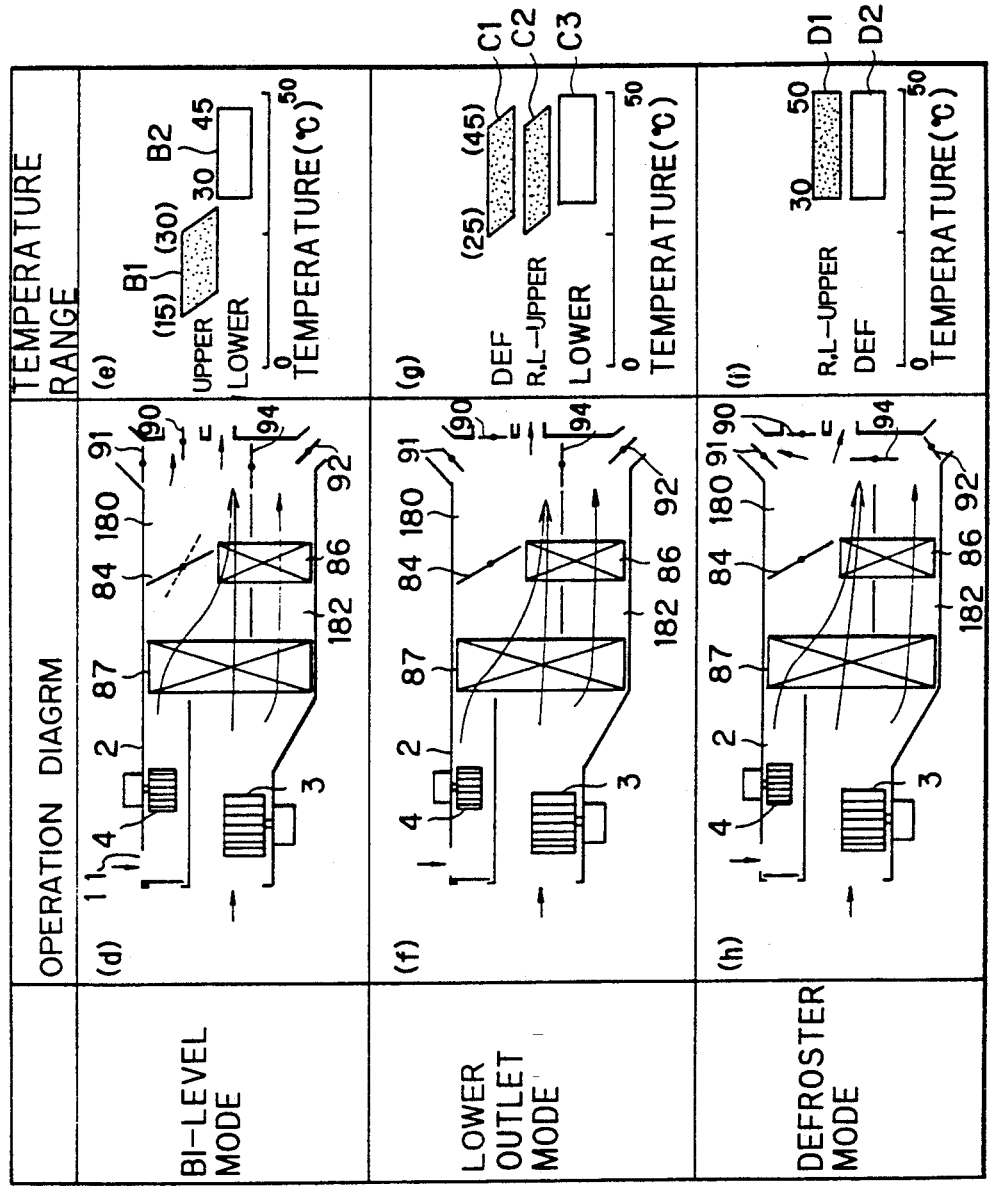

FIGS. 16A and 16B are similar to FIGS. 11A and 11B but illustrates the operation of the embodiment in FIG. 15.

Figure 17:
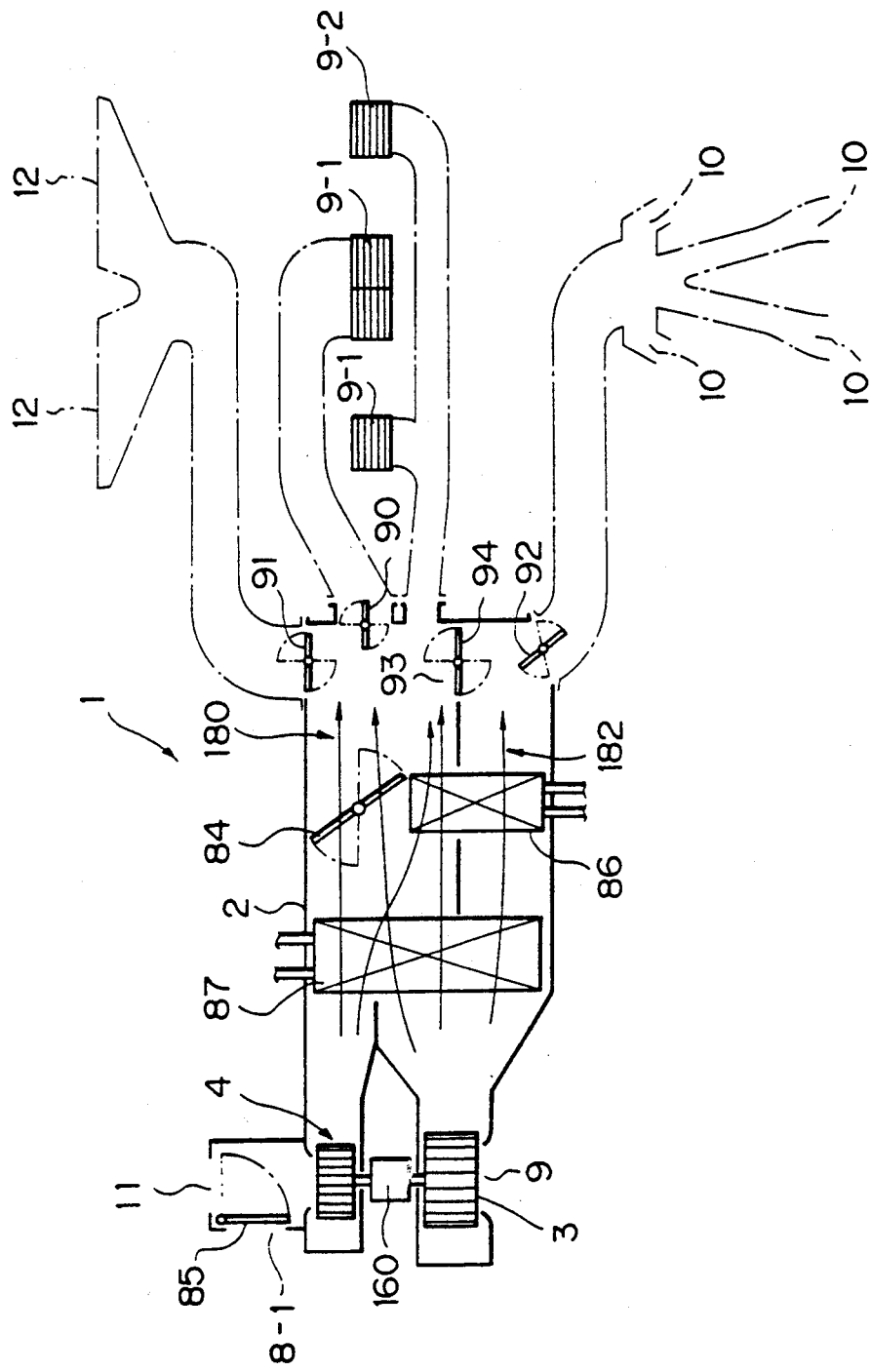

FIG. 17 is similar to FIG. 16, but schematically show the 11th embodiment.

Figure 18:
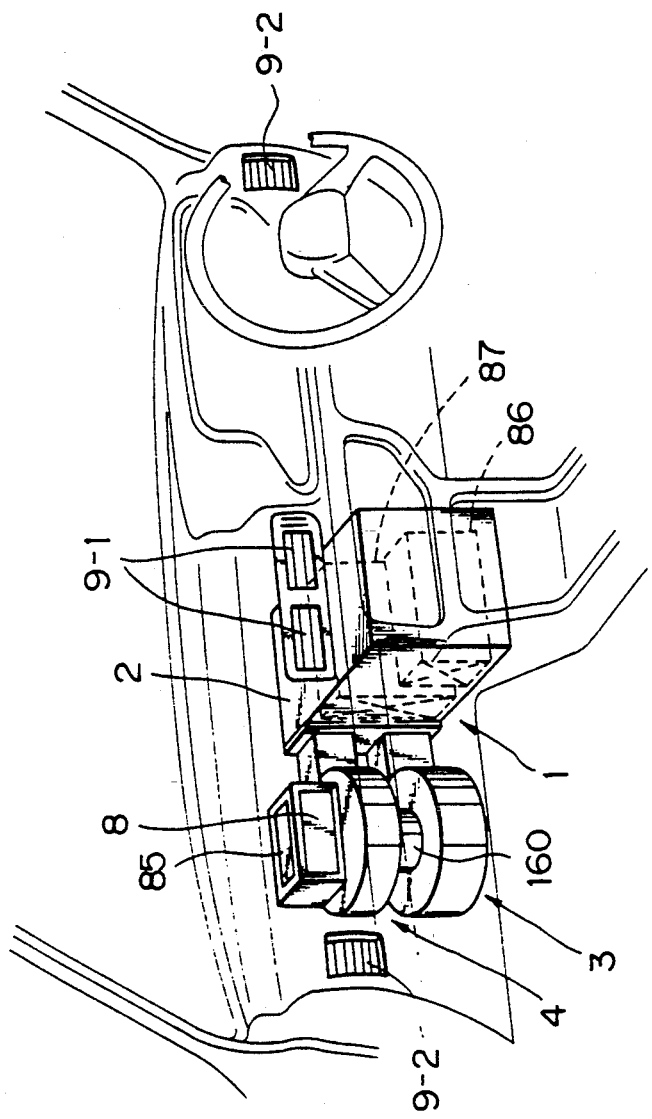

FIG. 18 is a perspective view showing an arrangement of parts in FIG. 17.

Figure 19:
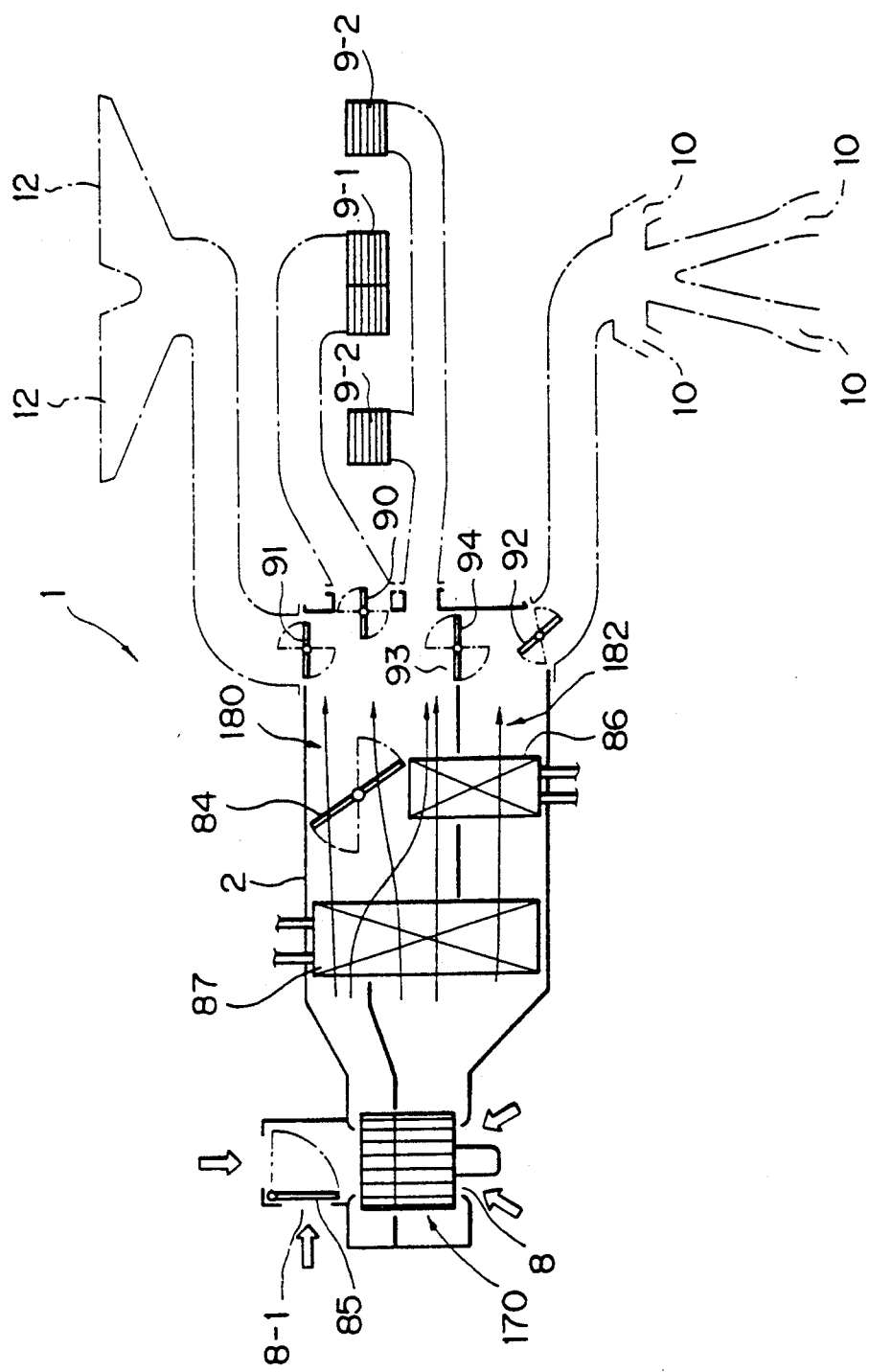
Figure 20:
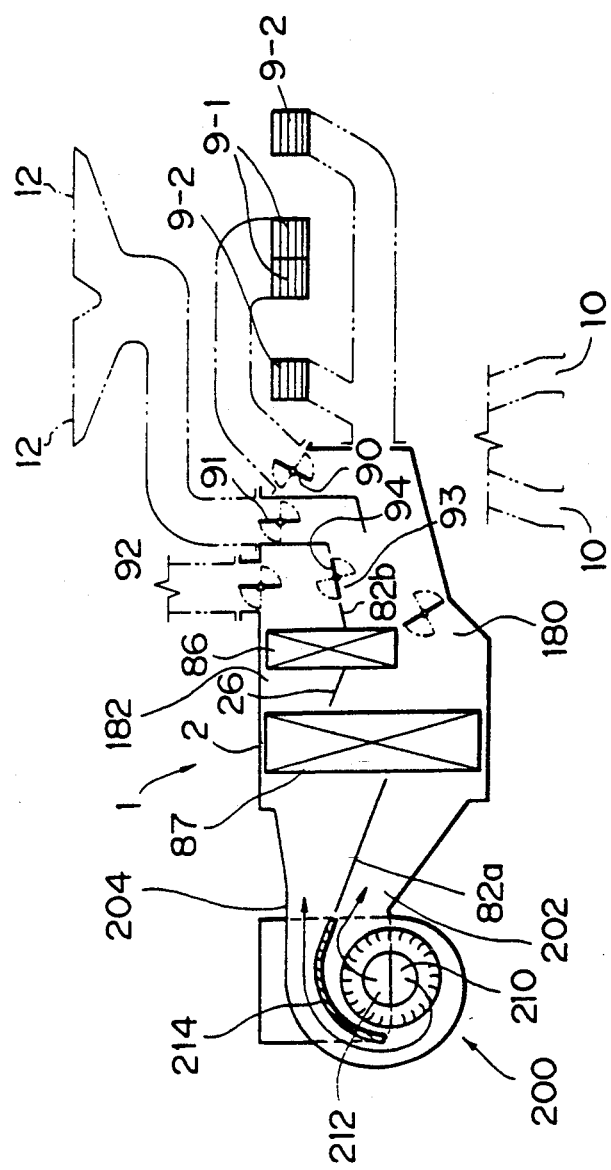

FIGS. 19 and 20 are similar to FIG. 16, but schematically show the 12th and 13th embodiments, respectively.

Figure 21:
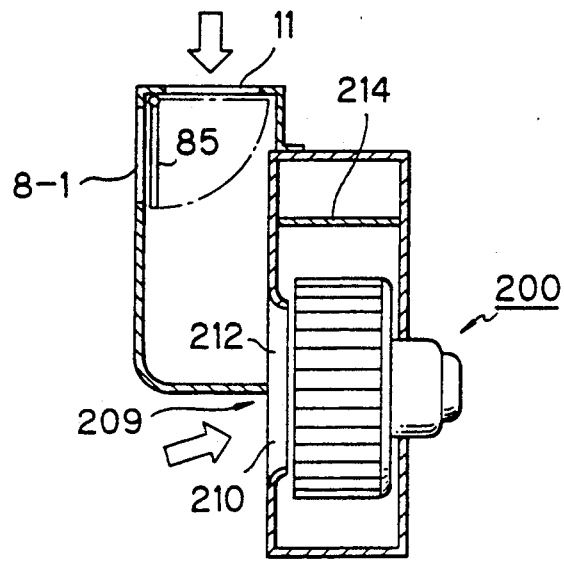

FIG. 21 is a cross sectional view of a fan in the embodiment in FIG. 20.

Figure 22:
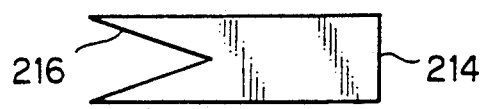
Figure 23:
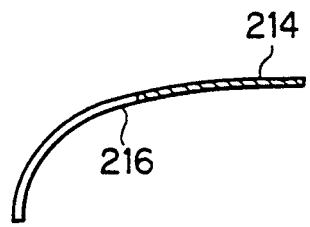

FIGS. 22 and 23 are upper and side views of the guide plate in FIG. 21, respectively.

DESCRIPTION OF PREFERRED EMBODIMENT

Figure 1:
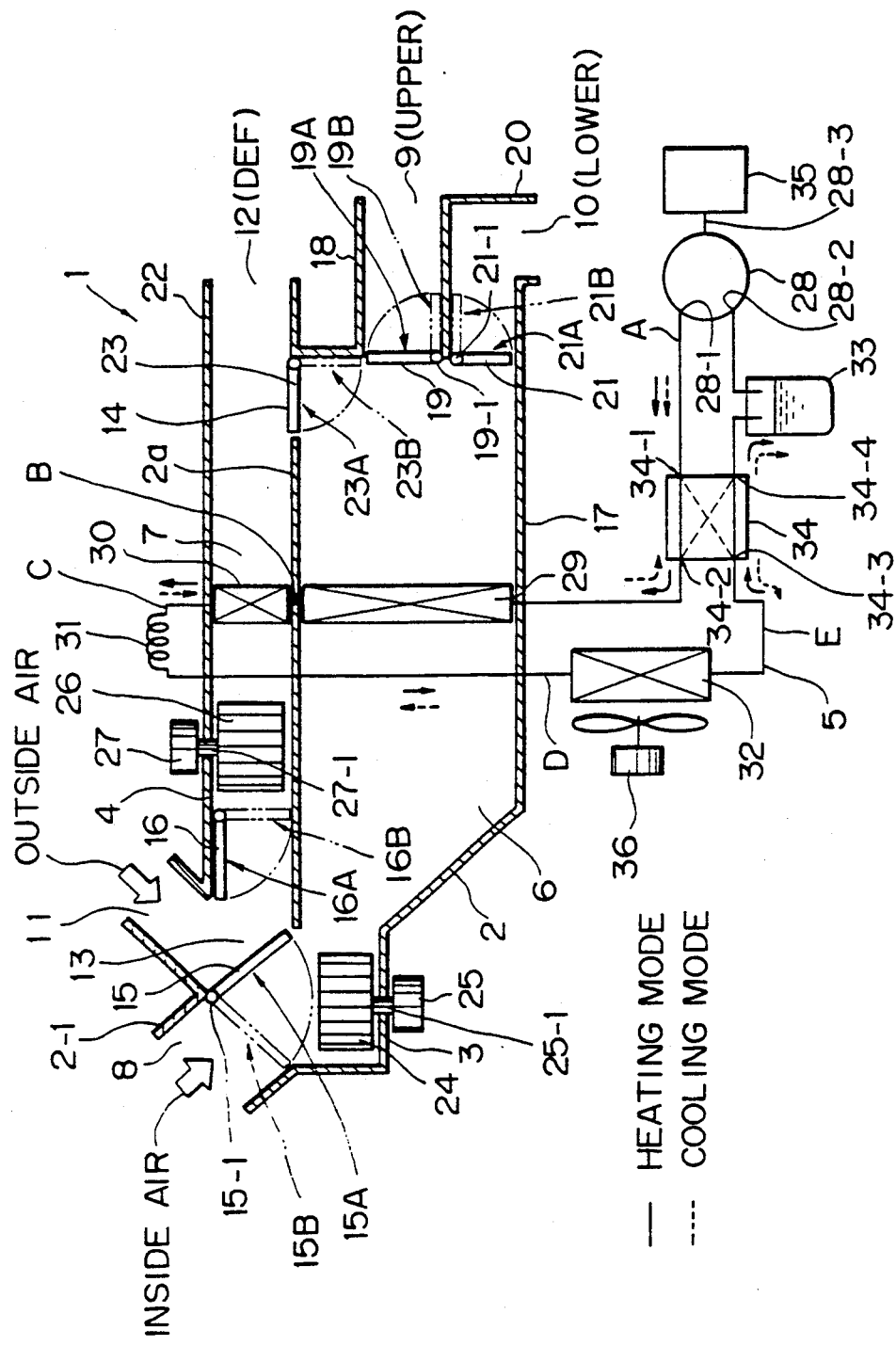
FIG. 1 is a schematic view of an air conditioning apparatus according to the present invention.

Now, a first embodiment of the present invention will be explained with reference to FIGS. 1 and 2. In FIG. 1, a reference numeral 1 denotes an air conditioning apparatus for an electric automobile. The air conditioning apparatus 1 includes an air flow duct 2, a first blower 3, a second blower 4, and an accumulator type refrigerating circuit 5.

The air flow duct 2 has a body portion 17, which has, at its first end, a duct portion 2-1 for defining therein an inside air inlet 8 and an outside air inlet 11, and, at its second end, an upper duct 18 for defining therein an upper outlet (face outlet) 9 for directing the air flow to the upper portion of a passenger, a lower duct 20 of defining therein a lower outlet (foot outlet) 10 for directing the air flow to the lower portion of the passenger, and a defroster duct 22 for defining therein a defroster outlet 12 for directing the air flow to the lower of the windshield. Furthermore, the air flow duct is provided therein with a partition wall 2a for separating the space in the duct 2 into a first air passageway 6 and a second air passageway 7, which are parallel to each other. The first air passageway 6 is for directing the inside air (air in the cabin of the vehicle) from the inside air inlet 8 into the upper outlet 9 and the lower outlet 10. The second air passageway 7 is for directing the outside air from the outside air inlet 11 into the defroster outlet 12.

The air flow duct 2 has, at a location near the inlets 8 and 11, a connection passageway 13, where an air switching door 15 is provided so that it is rotatable about an axis 15-1. The door 15 is rotated between an inside air recycle mode position 15A (solid line) where the inside air inlet 8 communicates with the first passageway 6 and the outside air inlet 11 communicates only with the second passageway 7, and an outside air introduction mode position 15B (phantom line) where the outside air inlet 11 is connected, via the connection passageway 13, not only to the second passageway 7 but also to the first passageway 6. The first blower 3 is located in the connection passageway 13 below the first door 15 at a position where the switching movement of the door 15 is not interrupted. When the switching door 15 is at the inside air recycle mode position 15A, the inside air from the inside air inlet 8 is introduced into the first passageway 6 so that the inner recirculated air from the cabin is discharged into the cabin. When the switching door 15 is at the outside air introduction mode position 15B, the air from the inlet 11 is introduced into the first passageway 6 via the connection passageway 13 and is discharged into the cabin. It should be noted that a lever (not shown) is provided at an operation panel provided in the cabin for obtaining a switching movement of the switching valve 15 between the recycle mode position 15A and the outside air introduction mode position 15B.

A shut off door 16 is provided at an end of the second passageway 7 upstream from the second fan 4 for a movement between a position 16A (solid line) for opening the second passageway 7, and a second position 16B (phantom line) for shutting off the second passageway 7. The shut-off door 16 is for preventing the outside air from being introduced into the second passageway 7 without rotation of the second blower 4 under ram pressure generated at the outside air inlet 11 owing to the movement of the vehicle.

An upper opening control door 19 is arranged at an end of the upper duct 18 near the body portion 17 so that the door 19 is rotated about an axis 19-1 between a closed position 19A (solid line) and an opened position 19B (phantom line) for controlling the flow of air to the upper outlet 9. An upper opening control door 21 is arranged at an end of the lower duct 20 near the body portion 17 so that the door 21 is rotated about an axis 21-1 between a closed position 21A (solid line) and an opened position 21B (phantom line) for controlling the air flow from the lower opening 10. A communication passageway 14 is arranged at the end of the partition 2a, and a defroster door 23 is arranged in the opening 14 so that the door 23 is moved between a closed position 23A (solid line) for closing the passageway 14 such that the first and second passageways 6 and 7 are disconnected from each other, and an opened position 23B (phantom line) for communicating the first and second passageways 6 and 7 with each other.

The upper outlet control door 19, the lower outlet control door 21 and the defroster door 23 are connected to respective motors (not shown), which are connected to a computer controlled control circuit (not shown) or a manual outlet switching lever on a control panel (not shown) for operating the respective doors 19, 21 and 23. When in a heating mode, the upper opening control door 19 is closed (solid line 19A), the lower opening control door 21 is opened (phantom line 21B), and the defroster control door 23 is closed (solid line 23A), so that the air from the duct 1 is discharged from the lower opening 10.

When in a defroster mode, the upper opening control door 19 is closed (solid line 19B), the lower opening control door 21 is closed (solid line 21A), and the defroster control door 23 is opened (phantom line 23B), so that the air from the duct 1 is discharged from the defroster opening 12.

When in a heating and defroster mode, the upper opening control door 19 is closed (solid line 19A), the lower opening control door 21 is opened (phantom line 21B), and the defroster control door 23 is opened (phantom line 23B), so that the air from the duct 1 is discharged from both the lower opening 10 and the defroster opening 12.

When in a bi-level mode, the upper opening control door 19 is opened (phantom line 19B) or is in an intermediate position between the closed position 19A (solid line) and the opened position 19B (phantom line), the lower opening control door 21 is opened (phantom line 21A), or is in an intermediate position between the closed position 21A (solid line) and the opened position 21B (phantom line), and the defroster control door 23 is closed (solid line 23A) or is in an intermediate position between the closed position (solid line 23A) and the opened position 23B (phantom line).

Finally, when in an upper outlet mode (face mode), the upper opening control door 19 is opened (phantom line 19B), the lower opening control door 21 is closed (solid line 21A), and the defroster control door 23 is closed (solid line 23A), so that the air from the duct 1 is discharged from the upper opening 9.

A first blower 3 is constructed of a blower fan 24 having an axial inlet and circumferentially spaced radial outlets, and a blower motor 25 having a rotating shaft 25-1 for generating a rotational movement of a predetermined rotational speed applied to the blower fan 24. The blower motor 25 is an electric motor energized by a battery mounted on the vehicle. The fan 24 of the first blower 3 is arranged in the first passageway 6 for generating an air flow therein. A second blower 4 is constructed of a blower fan 26 having an axial inlet and circumferentially spaced radial outlets, and a blower motor 27 having a rotating shaft 27-1 for generating a rotational movement of a predetermined rotational speed applied to the blower fan 26. The blower motor 27 is an electric motor energized by the battery. The fan 26 is arranged in the second passageway 7 downstream from the defroster shut off door 16 for generating an air flow in the second passageway 7. It should be noted that the control circuit (not shown) is provided with means for disconnecting the blower motor 27 from the battery when the defroster shut off door 16 is closed (phantom line), which causes the blower fan 26 to stop.

The refrigerating system 5 is constructed of a refrigerant compressor 28, a first inside heat exchanger 29, a second inside heat exchanger 30, a pressure reducer 31, an outside heat exchanger 32 and an accumulator 33. The refrigerating system 5 is further provided with a four port two position switching valve 34 that has a first port 34-1 connected to an output 28-1 of the compressor 28, a second port 34-2 connected to the first inside heat exchanger 29, a third port 34-3 connected to the outside heat exchanger 32, and a fourth port 34-4 connected to the accumulator. The switching valve 34 is switched between a first position where, as shown by solid lines, the first and second ports 34-1 and 34-2 are connected, and the third and fourth ports 34-3 and 34-4 are connected, and a second position where, as shown by dotted lines, the first and third ports 34-1 and 34-3 are connected, and the second and fourth ports 34-2 and 34-4 are connected. When in the first position of the switching valve 34, as shown by the solid lines, a recirculated flow of the refrigerant, as shown by solid arrows from the outlet 28-1 of the compressor is obtained, in order, at the first port 34-1, the second port 34-2, the first inner heat exchanger 29, the second inner heat exchanger 30, the pressure reducer 31, the outside heat exchanger 32, the third port 34-3, the fourth port 34-4, the accumulater 33, and the inlet port 28-2 of the compressor. Such a recirculated flow of refrigerant is for operating the first and second inner heat exchangers 29 and 30 as a condenser so as to obtain a heating operation and increase the temperature of the air flow in the duct 2. When in the second position of the switching valve 34, as shown by the dotted lines, a recirculated flow of refrigerant, as shown by dotted arrows from the outlet 28-1 of the compressor is obtained, in order, at the first port 34-1, the third port 34-3, the outside heat exchanger 32, the pressure reducer 31, the second inner heat exchanger 30, the first inner heat exchanger 29, the second port 34-2, the fourth port 34-4, the accumulator 33, and the inlet port 28-2 of the compressor. Such a recirculated flow of refrigerant is for operating the first and second inner heat exchangers 29 and 30 as an evaporator so as to obtain a cooling operation and decrease the temperature of the air flow in the duct 2.

The compressor 28 for the refrigerant is for issuing a gaseous high pressure refrigerant from the outlet 28-1 and for receiving a gaseous low pressure refrigerant from the accumulator 28. The compressor 28 has a rotating shaft 28-3 connected to an electric drive motor 35 supplied by a battery (not shown). Advantageously, the electric motor is an AC motor, and an inverter (not shown) is arranged between the electric motor 35 and the battery for controlling the rotational speed of the motor 35 in accordance with an electric current generated by the battery.

The first inner heat exchanger 29 is arranged in the first passageway 6 at a position downstream from the blower fan 24 and upstream from the communication passageway 14. The first inner heat exchanger 29 is arranged transverse to the flow of the air in the duct to contact the air flow therein. The first inner heat exchanger 29 is connected to the second port 34-2 of the switching valve 34 for transmission of the refrigerant therebetween. The first inner heat exchanger 29 operates, in a heating mode, as a refrigerant condenser for obtaining a heat exchange between a high temperature gaseous refrigerant from the compressor 28 and the air in the first air passageway 6 for heating the air, while the refrigerant condenses. Furthermore, the first inner heat exchanger 29 operates, in a cooling mode, as an evaporator for obtaining a heat exchange between the refrigerant in a combined gaseous and liquid state and the air in the first passageway 6 for cooling thereof while the refrigerant evaporates.

The second inner heat exchanger 30 is arranged in the second passageway 7 at a position downstream from the blower fan 26 and upstream from the communication passageway 14. The second inner heat exchanger 30 is arranged transverse to the flow of the air in the duct to contact the air flow therein. The second inner heat exchanger 30 is connected to the first heat exchanger 29 in series for transmission of the refrigerant therebetween. Furthermore, the second inner heat exchanger 30 is connected to the pressure reducer 31 for transmission of the refrigerant therebetween. The second inner heat exchanger 30, when in a heating mode, operates as a super cooler for the refrigerant for obtaining a heat exchange between the condensed high temperature refrigerant from the first heat exchanger 29 and the air in the second air passageway 7 for heating thereof, while the refrigerant is cooled. Furthermore, the second inner heat exchanger 30 operates, when in a cooling mode, a refrigerant evaporator subjected to a heat exchange between the refrigerant in a mist state and an air flow in the second air passageway 7 for cooling thereof, while the refrigerant evaporates.

The pressure reducer 31 is constructed, for example, as a capillary tube or nozzle or fixed orifice. The pressure reducer 31 is arranged between the second inner heat exchanger 30 and the outside heat exchanger 32 so that the refrigerant is subjected to adiabatic expansion, which brings the refrigerant into a mist state.

The outside heat exchanger 32 is arranged outside the cabin and is located in the refrigerating circuit 5 at a position between the pressure reducer 31 and the third port 34-3 of the switching valve 34. The outside heat exchanger 32 operates, when in the heating mode, a refrigerant evaporator for obtaining a heat exchange between the mist of the refrigerant from the pressure reducer 31 and an outside air flow created by an electrically operated outside fan 36 for evaporating the refrigerant. The outside heat exchanger 32 operates, when in the cooling mode, a condenser for obtaining a heat exchange of the refrigerant from the compressor 28 with outside air for condensing the refrigerant.

The accumulator 33 is arranged between the fourth port 34-4 of the switching valve 34 and the inlet 28-2 of the compressor for separating, from the inflow of the refrigerant, its gaseous part that is directed to the inlet 28-2 of the compressor 28.

Now, the operation of the embodiment in FIG. 1 will be explained with reference to FIGS. 1 and 2.

Heating Mode Upon Heating Operation

Figure 2:
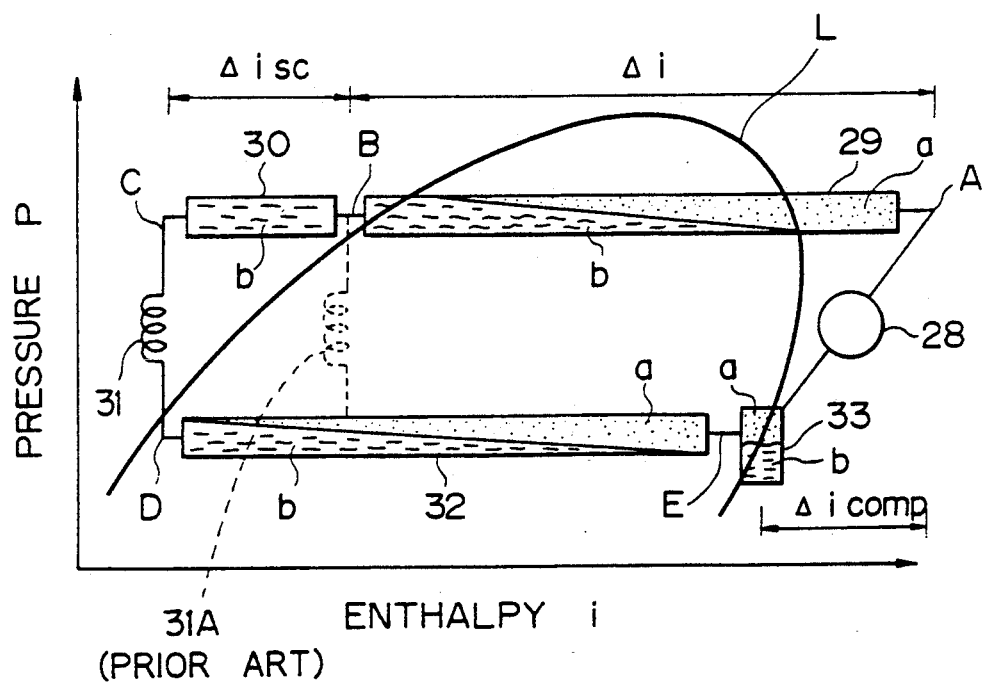
FIG. 2 shows a Mollier diagram on which the air conditioning apparatus according to the present invention is shown in a superimposed manner.

FIG. 2 is Mollier diagram illustrating a relationship between enthalpy and a pressure at various locations A, B, C, D and E of the refrigerating cycle, shown in FIG. 1 when in the heating operation. In FIG. 2, the refrigerant system in FIG. 1 is schematically illustrated in a "superimposed" manner. In FIG. 2 a curve L shows an equalized state, inside of which the refrigerant is in a combined gaseous and liquid state. Outside the saturated curve L on the side of a higher value of enthalpy, the refrigerant is in the gaseous state. Outside of the curve L on the side of the lower value of enthalpy, the refrigerant is in the liquid state. Namely, at the position A between the compressor 28 and the first inner heat exchanger 29 the refrigerant is in a gaseous state. At position B between the first and second inner heat exchangers 29 and 30, and at position C between the second inner heat exchanger 30 and the pressure reducer 31, the refrigerant is in the liquid state. At position D between the pressure reducer 31 and the outside heat exchanger 32, and at position E between the outside heat exchanger 32 and the accumulator 33, the refrigerant is in a combined liquid-gas state.

During this heating operation, the passenger controls the door 15 to be situated at the dotted position 15B where the inside air inlet 8 is opened, while the connection passageway 13 to the outside inlet 11 is closed, thereby entering the inner air recirculation mode. Furthermore, the shut door 16 is in its opened position 16A as shown by the solid line, the vent door 19 is in its closed position 19A as shown by the solid line, the foot door 21 is in its opened position 21B as shown by the dotted line, and the defroster door 23 is in its closed position 23A as shown by the solid line. Furthermore, the blower motor 25 of the first blower 3 and the blower motor 27 of the second blower 4 are supplied by the battery (not shown), so that the blower fans 24 and 26 are rotated at respective rotational speeds, so that the inside air from the inlet 8 is introduced into the first air passageway 6, and the outside air from the inlet 11 is introduced into the second air passageway 7. Furthermore, the switching valve 34 is in its first position when the first and second ports 34-1 and 34-2 are connected and the third and fourth ports 34-3 and 34-4 are connected, so as to obtain a recirculated flow of refrigerant as shown by solid arrows.

The high pressure compressed gaseous state refrigerant at the compressor 28 as shown at the portion A in FIG. 2 is, via the four port switching valve 34, introduced into the first inner heat exchanger 29. The gaseous refrigerant introduced into the first inner heat exchanger 29 is cooled to obtain a reduction $\Delta i$ in the enthalpy between the states A and B as shown in FIG. 2 owing to the fact that the air in the first air passageway 6 is deprived of the heat of the refrigerant. It should be noted that the refrigerant enters the first inner heat exchanger 29 in the gaseous state a. As the refrigerant moves along the first inner heat exchanger 29, it is progressively liquidized and increases in volume in the liquid state b. When the refrigerant leaves the first inner heat exchanger 29, it is completely changed to a liquid state b. The flow of air having an increased temperature owing to an heat exchange with the refrigerant at the first inner heat exchanger 29 is issued out of the lower outlet 10 toward the lower portions of a passenger owing to the fact that the lower outlet control door 21 is in the opened position 21B, while the defroster door 23 and the upper outlet control door 19 are in their closed positions 23A and 19A.

The high temperature refrigerant issued out of the first inner heat exchanger 29 is introduced into the second inner heat exchanger 30 so that a heat exchange operation again takes place between the refrigerant in the second inner heat exchanger 30 and the air introduced into the second air passageway 7 owing to the open position 16A of the door 16. As a result, low temperature air in the passageway 7 is deprived of heat from the refrigerant in the heat exchanger 30, thereby sub cooling the refrigerant to a temperature near atmospheric air temperature and obtaining a reduction $\Delta isc$ in the enthalpy between the states B and C as shown in FIG. 2. It should be noted that the refrigerant introduced into the second inner heat exchanger 30 is in the liquid state b completely. The flow of air having an increased temperature in the second air passageway 7 after an heat exchange with the refrigerant at the second inner heat exchanger 30 is issued from the defroster outlet 12 toward the lower part of the windshield, so that an air curtain as a result of a flow of low humidity air is created along the inner surface of the windshield, thereby preventing the inner surface of the windshield from clouding. It should be noted that such an introduction of outside fresh air from the outside air inlet 11 can prevent the air in the cabin from being contaminated by an increased density of carbon dioxide in the cabin while limiting the amount of air introduced into the second air passageway 7 to a least the required level.

The low temperature liquid state refrigerant from the second inner heat exchanger 30 is subjected to an adiabatic expansion process when it moves along the pressure reducer 31 so as to decrease the pressure of the refrigerant between the states C and D in FIG. 2. The reduced pressure refrigerant from the pressure reducer 31 is introduced into the outside heat exchanger 32, where the refrigerant is evaporated owing to the fact that the air contacting the heat exchanger 32 is deprived of heat, and is introduced, via the switching valve 34 in FIG. 1, into the accumulator 33 for separating the gaseous refrigerant. It should be noted that the refrigerant is in a mist state in increased portions in the liquid state b when it is introduced into the outside heat exchanger 32 at the point D in FIG. 2. The portion in the gaseous state a is increased as it moves along the outside heat exchanger 32, and is completely changed to the gaseous state a at the outlet D.

At the accumulator 33, a refrigerant phase separation takes place between the gaseous state a and the liquid state b, and the gaseous state refrigerant a in the accumulator is introduced into the inlet 28-2 of the compressor 28.

In this mode of operation, the air other than the outside air introduced from the outside air inlet 11 in the cabin introduced from the inside air inlet 8 is recirculated, thereby reducing the heating load significantly, and because of the reduction in the heating load, the capacity of refrigerating cycle for the heating operation can be reduced, thereby reducing the driving load of the refrigerant compressor 28, and the electric power consumption of the compressor 28.

In the prior art, no provision is made for the second inner heat exchanger 30. Namely, as shown in FIG. 2, a pressure reducer 31A in the prior art is as shown by a dotted line connected between the first inner heat exchanger 29 and the outside heat exchanger 32. In the prior art, only the first inner heat exchanger 29 is provided wherein an heat exchange between the refrigerant and the recirculated air from the cabin is carried out. In other words, the temperature of the air from the cabin that is subjected to an heat exchange is relatively high. As a result, an effective sub-cooling operation cannot be effected in the prior art construction. Contrary to this, according to this embodiment of the present invention, there is a second heat exchanger 30 in the second air passageway 7 for the outside air having a low temperature (for example 0° C.), so that a sub-cooling operation in accordance with the outside air temperature and corresponding to the reduction $\Delta isc$ in the enthalpy, can be obtained. Namely, a coefficient of performance (cop) of the refrigerating cycle 5 is a ratio of the change in enthalpy on the heating side $\Delta i$ to the change in enthalpy by the compression operation at the compressor 28, $\Delta_{icomp}$. Namely, the value of the COP in the prior art is:

$$\frac{\Delta i}{\Delta_{icomp}}$$

while the value of the COP in the present invention is:

$$\frac{\Delta i + \Delta isc}{\Delta_{icomp}}$$

As a result, according to the present invention, the heating performance thereof is enhanced over the construction of the prior art while power consumption is reduced.

Defroster Mode Under a Heating Operation

When in defroster mode, in response to a control operation by the passenger, the switching damper 15 is in position 15A, where the inner air inlet 8 is connected to the first air passageway 6, while the communication passageway 13 is disconnected to the passageway 6. Furthermore, the defroster shut door 16 is in the open position 16A, the upper outlet door 19 is in the closed position 19A, the lower outlet door 21 is in the closed position 21A, and the defroster control door 23 is the open position 23B.

The rotational movement of the first blower fan 24 of the first blower 3 and the second blower fan 26 of the second blower fan 26 causes the inside air from the inlet 8 to be introduced into the first air passageway 6 and causes the outside air from the inlet 11 to be introduced into the second air passageway 7. Thus, the heated air in the second air passageway 7 and the heated air in the first air passageway 6, via the communication passageway 14, are combined, and discharged from the defroster from the defroster outlet 12 to the lower portion of the inner surface of the windshield (not shown). Such a combined flow of hot air can expedite the de-clouding or de-frosting operation of the windshield. In this defroster mode, heat exchange operations at the first and second inner heat exchangers 29 and 30 are carried out in a similar way as that in the heating mode as explained with reference to FIG. 2. Namely, the first inner heat exchanger 29 operates as a condenser for heating the air in the passageway 6, and the second inner heat exchanger operates as a sub-cooler for emission of heat to the air in the second passageway 7. As a result, performance in the defroster mode is enhanced while electric power consumption is reduced.

Heat-Defroster Mode Under a Heating Operation

When in this mode, the passenger controls the switching door 15 so as to obtain the position 15A and open the inside air inlet 8 to the first passageway 6 and close the connection passageway 13 to the first passageway 6. Furthermore, the defroster door 16 is in the open position 16A, the upper outlet control door 19 is in its closed position 19A, the lower outlet control door 21 is in its open position 21B, and the defroster door 23 is in its open position 23B.

The rotational movement of the first blower fan 24 of the first blower 3 and the second blower fan 26 of the second blower fan 26 causes the inside air from the inlet 8 to be introduced into the first air passageway 6 and causes the outside air from the inlet 11 to be introduced into the second air passageway 7. Thus, the heated air at the first inner heat exchanger 29 in the first air passageway 6 is partly introduced, via the communication passageway 14, into the second passageway 7 to combine with the heated air from the second inner heat exchanger 30, and is discharged from the defroster outlet 12 toward the lower portion of the inner surface of the windshield so that an effective de-clouding operation is obtained. The remaining heated air in the first air passageway 6 is directed to the duct portion 20 and discharged from the lower outlet 20 toward the lower portions of the passenger. When the air flow from the defroster outlet 12 is not required, the supply of electric current to the blower motor 27 of the second blower 4 is cancelled, the defroster door 23 is moved to the closed position 23A and the defroster shut door 16 is moved to the closed position 16B.

Upper Outlet Mode Under a Cooling Operation

When in this mode, the passenger operates the switching door 15 to the inner recirculation position 15A for opening the inside air inlet 8 and for closing the connecting passageway 13, or to the outside air intake position 15B for closing the inside air inlet 8 and for opening the connection passageway 13. Furthermore, the upper outlet control door 19 is opened to the position 19B, the lower opening control door 21 is closed to the position 21A, and the defroster door 23 is closed to the position 23A. Furthermore, the defroster shut door 16 is closed to the position 16B.

Only the blower fan 24 of the first blower 3 is rotated for creating a flow of air in the first passageway 6 from the inside air inlet 8 or the outside air inlet 11 in accordance with the position 15A or 15B of the switching door 15, and because of the closed position 16B of the defroster shut door 16, when in the position 15B of the switching door 15, the air from the outside air inlet 11 can be introduced into the first air passageway 6.

In this mode, the switching valve 34 is switched to the second position where the first and third ports 34-1 and 34-3 are connected, and the second and fourth ports 34-2 and 34-4 are connected, so as to create flows of the refrigerant as shown by dotted arrows. As a result, the high pressure gaseous state refrigerant compressed at the compressor 28 is, via the first and third ports 34-1 and 34-3 of the four port switching valve 34, introduced into the outside heat exchanger 32, where heat is emitted from the refrigerant thereby decreasing the temperature of the refrigerant for condensation. The condensed refrigerant is subjected to the adiabatic expansion process, and is directed to the second inner heat exchanger 30. However, a heat exchange operation does not take place at the second inner heat exchanger 30 because the defroster shut door 16 is in the closed position 16B so as to prevent an air flow from being created in the second air passageway 7 in which the second inner heat exchanger 30 is arranged. The refrigerant is then introduced into the first inner heat exchanger 29 where a heat exchange takes place between the air in the first air passageway 6 and the refrigerant so as to absorb heat from the air while the refrigerant evaporates, and is, via the second and fourth ports 34-2 and 34-4, introduced into the accumulator 33 and the compressor 28. The cooled air at the first air passageway 6 at the first inner heat exchanger 29 is directed only to the upper air outlet duct 18 and discharged from the upper air outlet 9 toward the upper half portion of the passenger in the cabin, due to the fact that the lower outlet door 21 and the defroster door 23 are in the closed position 21A and 23A, respectively.

Figure 3:
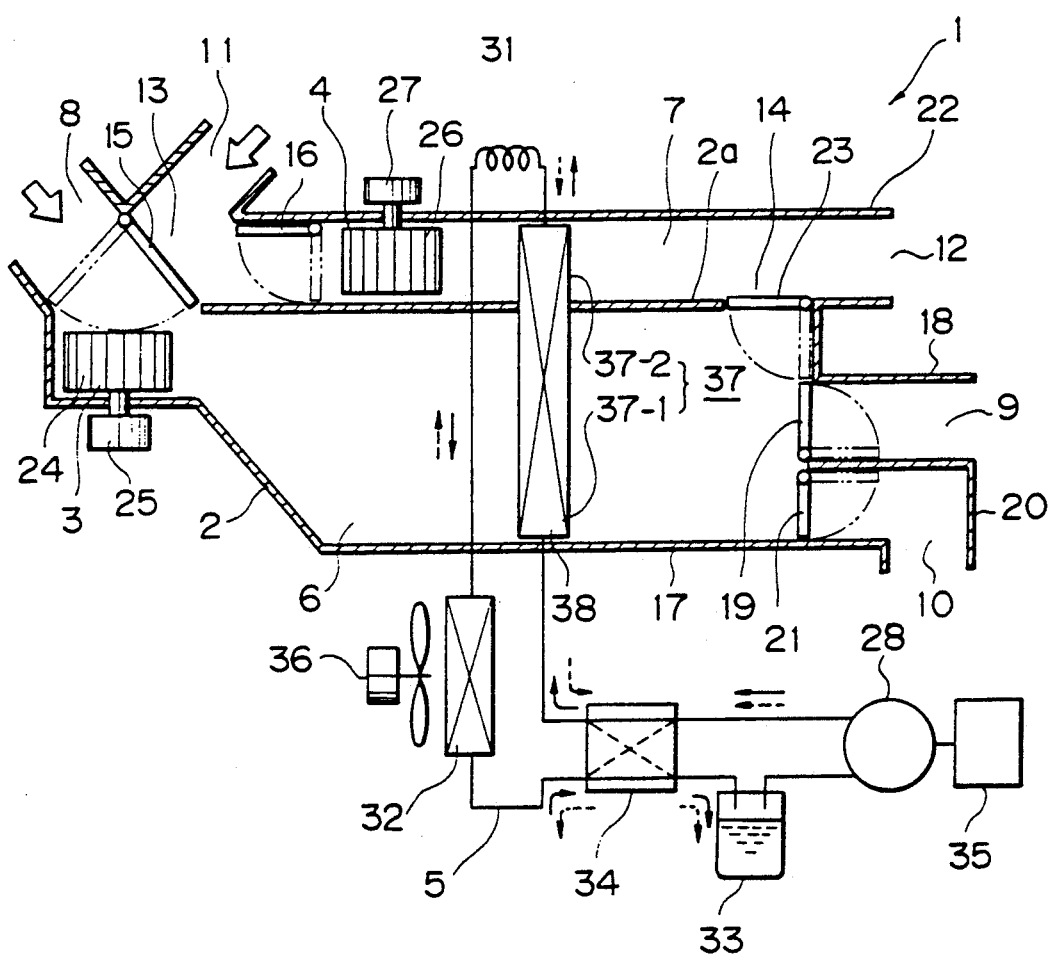
FIGS. 3 to 7 are similar to FIG. 1, but show schematically a second and sixth embodiment of the present invention, respectively.

FIG. 3 shows a second embodiment of the present invention, which features a single inner heat exchanger 37 that has a first section 37-1 arranged in the first air passageway and a second section 37-2 arranged in the second air passageway 7. Namely, the first and second inner heat exchangers 29 and 30 in the first embodiment are combined in the heat exchanger 37 in the second embodiment. In the second embodiment, the first section 37-1 operates in the same way as the first inner heat exchanger 29 in the first embodiment, and the second section 37-2 operates in the same way as the second inner heat exchanger 30 in the first embodiment.

Figure 4:
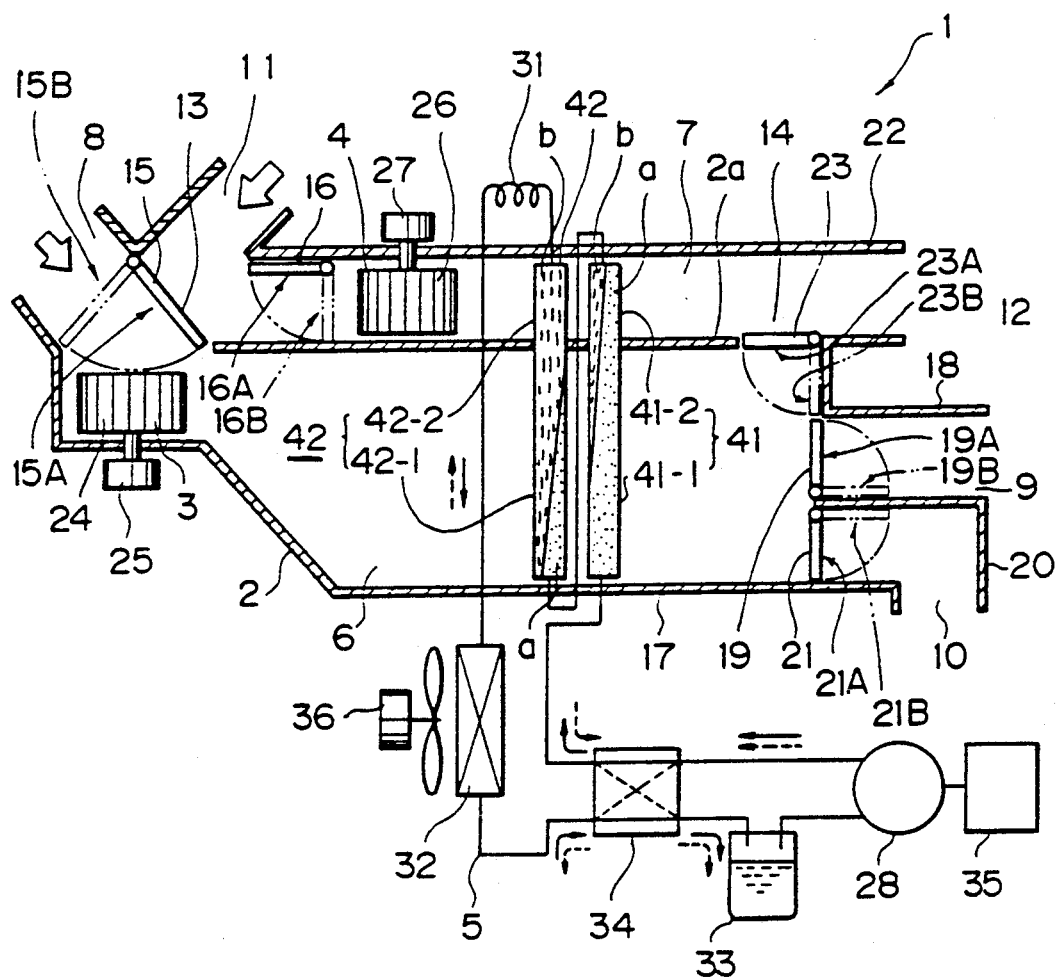

FIG. 4 shows a third embodiment that is suitable when the temperature of the air during the heating operation is too low by merely obtaining a heat exchange between the refrigerant in the second inner heat exchanger 30 and the air in the second passageway 7. In the third embodiment, a first and second inner heat exchangers 41 and 42, which are arranged in series along the direction of the flow of the refrigerant, are provided so that each of the heat exchangers 41 and 42 extend across the width of the first and second air passageways 6 and 7, in such a manner that the first heat exchanger 41 is located downstream from the second heat exchanger 43 in the direction of the air flows in the first and second air passageways 6 and 7. Namely, the first inner heat exchanger 41 is constructed by a first section 41-1 in the first passageway 6 and a second section 41-2 in the second passageway 7. The second inner heat exchanger 42 is constructed by a first section 42-1 in the first passageway 6 and a second section 42-2 in the second passageway 7.

The operation of the third embodiment will now be explained while focusing on a point that is different from the first embodiment. During the heating operation, the switching door 15 is in position 15A, the upper opening door 19 is in closed position 19A, the lower opening control door 21 is in opened position 21B, the defroster door 23 is in closed position 23A, and the defroster shut door 16 is in opened position 16A. The switching valve 34 is in the first position for obtaining a flow of the gas state refrigerant having a high pressure and a high temperature as shown by the solid arrows. The gaseous refrigerant is introduced into the first inner heat exchanger 41 so that a heat exchange takes place between the refrigerant in the first section 41-1 and the air passing through the first passageway 6 from the inside air inlet 8, and between the second section 41-2 and the air passing through the second air passageway 7 from the outside air inlet 11. As a result of such an heat exchange, the air in the first and second air passageways 6 and 7 are heated, while the refrigerant in the heat exchanger 41 is cooled. As a result of cooling the refrigerant, the gaseous state refrigerant introduced into the first heat exchanger 41 is gradually condensed. Namely, the ratio of the portion in the liquid state b is increased over the portion in the gaseous state a. However, at the outlet of the second section 41-1 of the first heat exchanger in the second air passageway 7 the refrigerant is still in a gaseous-liquid combined state of relatively high temperature. The high temperature refrigerant in the gas-liquid combined state is introduced into the first inner heat exchanger 42, so that a heat exchange takes place with the air in the first and second air passageways 6 and 7 for heating the air. The refrigerant introduced into the second inner heat exchanger 42 is cooled. At the outlet of the first section 42-1 of the second inner heat exchanger, the refrigerant is completely changed to the liquid state b, which is introduced into the second section 42-2 contacting the air flowing in the second air passageway 7. As a result, a super cooling operation takes place at the second section 42-2.

Such an arrangement of the first and second heat exchangers 41 and 42 in the embodiment in FIG. 4 can increase the amount of heat exchanged at the second air passageway 7 by the second sections 41-2 and 42-2 over the amount of heat exchanged at the second inner heat exchanger 30 in the first embodiment so as to increase the temperature of the air discharged from the defroster outlet 12.

Figure 5:
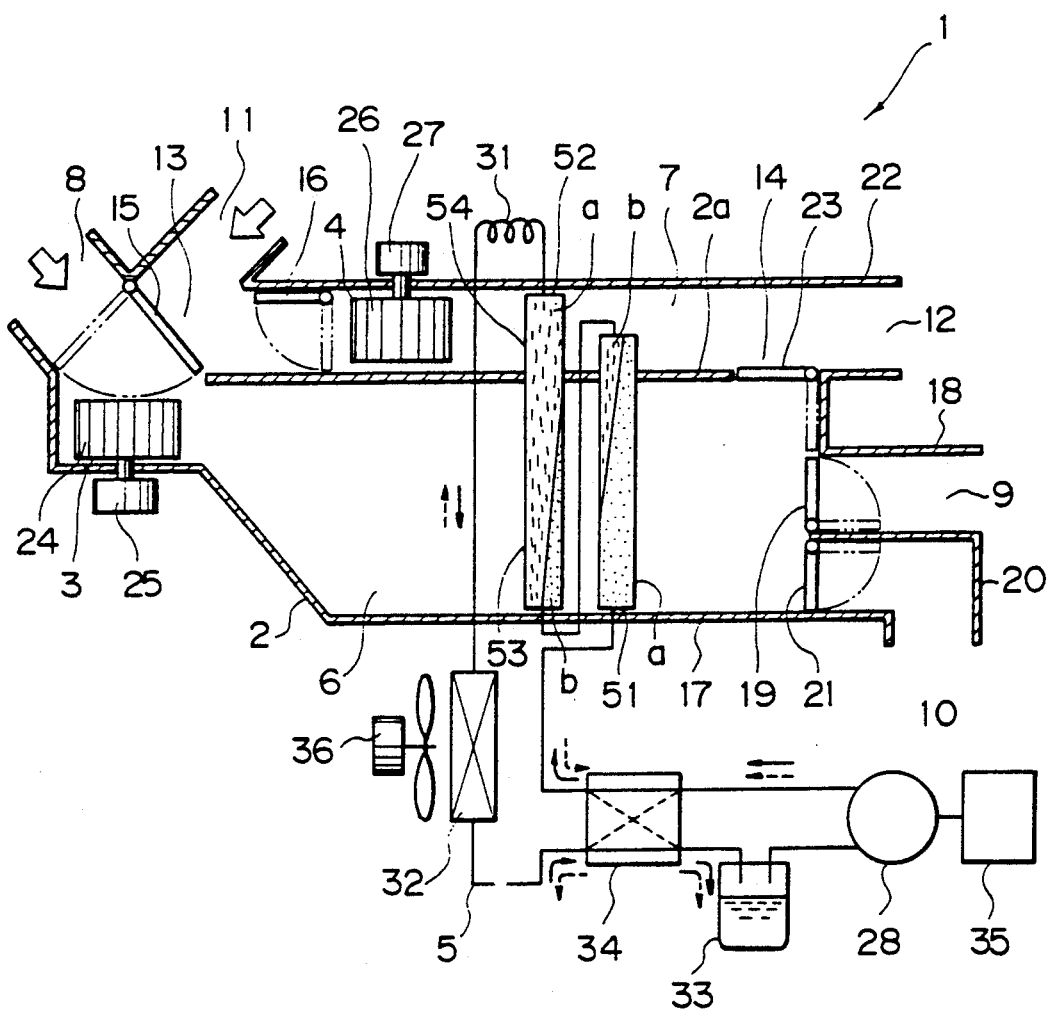

A fourth embodiment shown in FIG. 5 is a modification of the embodiment in FIG. 4 in that, although the first and second inner heat exchangers 51 and 52 in series are arranged across the first and second air passageways 6 and 7, the first inner heat exchanger 51 extends into the second air passageway 7 only partly. This embodiment is suitable when employment of the construction as shown in FIG. 4 causes the temperature of the air inssued from the defroster outlet 12 to increase excessively. According to the arrangement in FIG. 5, the first inner heat exchanger 51 extends into the second air passageway 7 only partly, which reduces the amount of heat exchanged with the heat exchanger 52 at the second air passageway 7 so as to obtain a desired temperature of the air issued from the defroster opening 12 during the heating operation.

Figure 6:
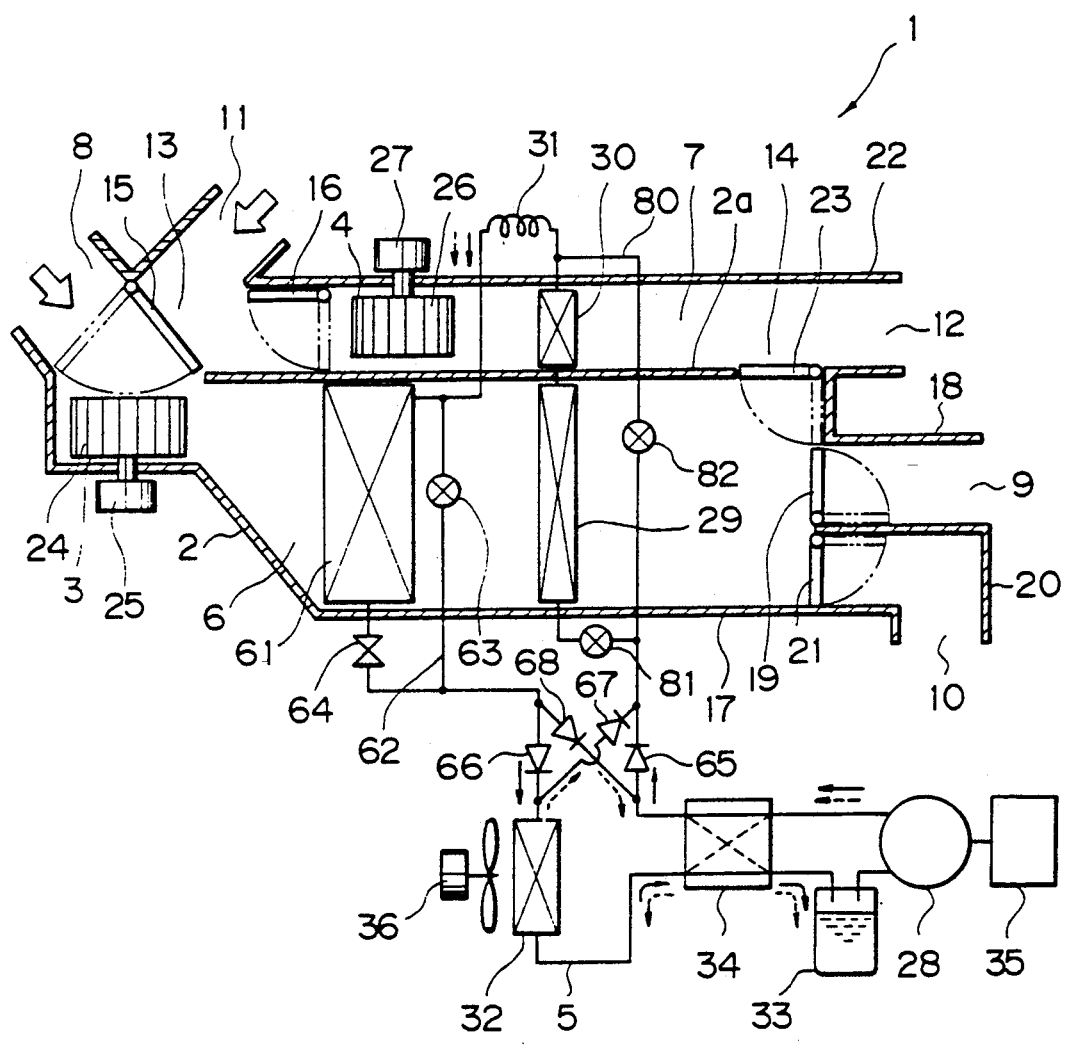

FIG. 6 shows a fifth embodiment featuring a refrigerant evaporator 61 arranged upstream from the first inner heat exchanger 29 for obtaining a dehumidifying operation. A by-pass passageway 62 is connected to the refrigerant circuit to by-pass the refrigerant evaporator 61. An electromagnetic valve 61 is arranged on the by-pass passageway 62, which is opened when a dehumidifying operation does not necessarily by-pass the refrigerant with respect to the refrigerant evaporator 61. A pressure control valve 64 is arranged in series with respect to the evaporator 61 for controlling the amount of refrigerant issued from the refrigerant evaporator 61 for maintaining a constant evaporating pressure at the refrigerant evaporator 61 and preventing frost from forming. A network for check valves 65, 66, 67 and 68 are provided, which allow both the first and second inner exchangers 29 and 30 to act as condensers whether in the heating or cooling mode. Furthermore, a by-pass passageway 80 that is connected to the refrigerating circuit so as to by-pass the first and second inner heat exchangers 29 and 30 is provided. An electromagnetic valve 81 is arranged in series with respect to the first inner heat exchanger. Another electromagnetic valve 82 is arranged on the by-pass passageway 80.

An operation of the fifth embodiment in FIG. 6 will now be briefly explained.

Heating Operation

During the heating operation, similar to the above mentioned embodiments, the switching valve 34 is in its first position to obtain a recirculated flow of refrigerant as shown by the solid arrows. The electromagnetic valve 81 is in an open position, and the electromagnetic valve 82 is in a closed position. The refrigerant from the compressor 35 is introduced, via the check valve 65, into the first inner heat exchanger 29 acting as an evaporator for emitting heat to the air in the first air passageway 6 while the refrigerant is cooled, and into a second inner heat exchanger 30 for imparting heat to the air in the second air passageway while the refrigerant is super cooled. An adiabatic expansion then takes place at the pressure reducer 31 for changing the refrigerant into a mist, and when the electromagnetic valve 63 is opened, when the dehumidifying operation is unnecessary, the refrigerant by-passes the heat exchanger 61, and is introduced, via the check valve 66, into the outside heat exchanger 32, whereat the refrigerant is evaporated for absorbing heat from the atmospheric. The thus generated gaseous refrigerant is returned, via the accumulator 33, into the compressor 28.

When dehumidifying is necessary, the electromagnetic valve 63 is closed, so that the refrigerant in the mist state from the pressure reducer 31 is introduced into the heat exchanger 61 acting as an evaporator to obtain heat from the air in the first air passageway 6, and is introduced, via the pressure regulator valve 64 and the check valve 66, into the outside heat exchanger 32 whereat the ambient air, before the refrigerant is returned to the accumulator 33 and the compressor 28, is deprived of heat.

Cooling Operation

During the cooling operation, the switching valve 34 is in its second position so as to obtain the recirculated of the refrigerant as shown by the dotted arrow. The electromagnetic valve 63 is closed, and when the cooling requirement is minimal, the electromagnetic valve 81 is opened, while the electromagnetic valve 82 is closed. In this case, the compressed refrigerant from the compressor 28 is introduced into the outside heat exchanger 32 whereat the refrigerant emits heat to the outside air as the refrigerant is condensing. The condensed refrigerant is introduced, via the check valve 67 and the electromagnetic valve 81, into the first inner heat exchanger 29 whereat heat is emitted to the air passing through the first air passageway 6, and is introduced into the second inner heat exchanger 30 whereat heat is emitted to the air passing through the second air passageway 7. As a result, a super cooling operation takes place at the first and second inner heat exchangers 29 and 30. The super cooled refrigerant is introduced into the pressure reducer 31 whereat adiabatic expansion takes place and reduces the pressure of the refrigerant, which is introduced into the heat exchanger 61 for extracting heat from the air flowing in the first air passageway 6 while the refrigerant is evaporated. The evaporated refrigerant is introduced, via the pressure regulating valve 64 and the check valve 68, into the accumulator 33 and the compressor 28 for a repetition of the above cycle. Namely, during this mild cooling operation, the cooled air in the first air passageway 6, after contacting the heat exchanger 61, is heated slightly by the heat exchanger 29 acting as an additional condenser.

When a strong cooling operation is required, the electromagnetic valve 81 is closed, and the electromagnetic valve 82 is opened, so that the refrigerant by-passes the first and second inner heat exchangers 29 and 30, which prevent a mild heating operation from taking place at the heat exchangers 29 and 30. As a result, the temperature of the air issued from the first air passageway 6 and directed to the desired outlet is reduced significantly.

In short, according to the embodiment in FIG. 6, during the heating operation, a refrigerant passes through the heat exchanger 61 acting as an evaporator located in the first air passageway 6 located upstream from the first inner heat exchanger 29 as a condenser so that moisture in the air flow is removed, and is directed to the heat exchanger 29 for heating the air. As a result, a dehumidified heating operation can be obtained.

Furthermore, according to the embodiment in FIG. 6, the first and second inner heat exchangers 29 and 30 operate as condensers during both the heating and cooling operations. As a result, an abrupt switching from the cooling operation to the heating operation does not increase the humidity of the air discharged into the cabin, which may occur in the previous embodiment because the condensed water evaporates at the heat exchangers 29 and 30.

Figure 7:
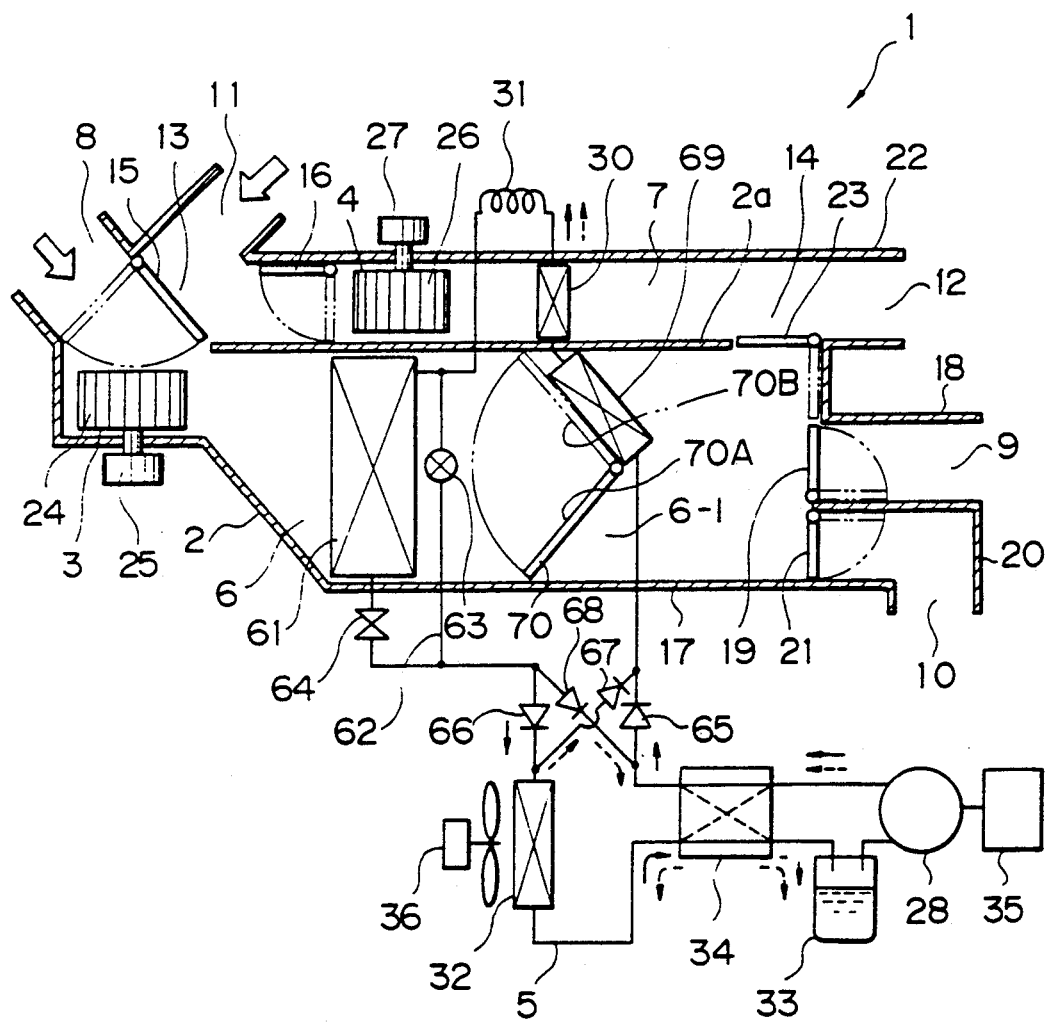

FIG. 7 shows a sixth embodiment, which is a modification of the fifth embodiment in FIG. 6, in that the first inner heat exchanger 69 having a shortened length is arranged in the first air passageway 6 so that it is inclined in the direction of the flow of air and creates a by-pass passageway 6-1. Furthermore, an air mix door 70 is arranged so that it moves between a first position 70A, where the first inner heat exchanger 69 is opened while the by-pass passageway 6-1 is closed, and a second position 70B where the first inner heat exchanger 69 is closed while the by-pass passageway 6-1 is opened. The air mix door 70 can be located at a desired intermediate position between the first position 70A and the second position 70B for obtaining a desired ratio of the amount of air directed to the second heat exchanger 69 and the amount of air directed to the by-pass passageway 6-1.

During the heating or dehumidifying operation in the embodiment in FIG. 7, the air door 70 is in its first position 70A, which allows all of the air to be introduced into the second inner heat exchanger 69. In this case, the first and second inner heat exchangers 69 and 30 operate as a condenser for heating the air connecting therewith. The upstream heat exchanger 61, during a dehumidifying operation, acts as an evaporator for dehumidifying the air before it is heated by the first and second inner heat exchangers 69 and 30. During the cooling condition, the first and second inner heat exchangers 69 and 30 also operate as a condenser, while the upstream heat exchanger 61 operates as an evaporator. The degree of opening the air mix door 70 is controlled in accordance with the cooling requirement. The more the door moves toward the second position 70B, the larger the amount of cooled air by-passing the inner heat exchanger 69 for reducing the temperature of the air issued from the desired outlets.

In the above mentioned 1st to 6th embodiments, the air conditioning system is applied to an electric automobile, where the compressor 28 is operated by an electric motor 35. However, the present invention can also be applied to an air conditioning system for a vehicle with an internal combustion engine wherein the compressor is operated by the internal combustion engine.

In the above mentioned 1st to 6th embodiments, the refrigerating cycle is provided with an accumulator. However, the present invention can be applied to refrigerating system where a receiver is used in place of the accumulator.

In the above 1st to 6th embodiments, separate blowers 3 and 4 are arranged in the first and second air passageways 6 and 7, respectively. However, a single or a plurality of fans operated by a motor is provided for creating an air flow in the first and second air passageways 6 and 7.

In the above 1st to 6th embodiments, a pair of first and second air passageways 6 and 7 are formed in the duct 2. However, the first and second air passageways 6 and 7 can be constructed by a plurality of parallel sections or a plurality of ducts; each duct provided with first and second air passageways. Furthermore, the first and second air passageways, in tube shape, can be arranged so that one of the passageways is arranged inside of the other.

In the 1st to 6th embodiments, the air duct 2 is formed therein with the connection passageways 13 and 14, and provision is made for the switching door 15 and the defroster door 23 for controlling the opening or closing of the connection passageways 13 and 14. In place of this, separate ducts are provided, for defining therein, with passageways acting as first and second passageways, respectively, and the connection passageways 13 and 14, and the switching door 15 and defroster door 23 can be eliminated. In the latter case, the first and second passageways in these ducts are not necessarily arranged adjacent to each other as in the above embodiment.

According to the above the 1st to 6th embodiments, during the heating operation, only the outside air from the outside air inlet 11 is discharged toward the windshield from the defroster outlet 12, which can prevent the windshield from clouding. Such an introduction of outside air is sufficient for obtaining a desired ventilation effect, thereby maintaining the quality of the air inside the cabin. Furthermore, during the heating operation, only the preliminary heated inside air from the inside air inlet 8 as recirculated is discharged from the lower outlet 20 toward the cabin, thereby reducing the load of the refrigerating cycle and reducing the power consumption at the refrigerant compressor. Furthermore, the second heat exchanger 3 in the second air passageway 7 can provide during a heating operation, an effective super cooling operation to a temperature as low as 0° C., owing to an heat exchange between the refrigerant and the low temperature air from the outside air inlet 11, so that a heating operation that saves electric energy can be obtained.

FIG. 8 illustrates a seventh embodiment, which features, over the embodiments in FIGS. 1 to 7, in addition to the first and second passageways 6 and 7, a third passageway 78 provided through which the air flow passes not only through the first inner heat exchanger 86 but also through the second inner heat exchanger 87. Namely, the duct 2 included therein with a first partition wall 82a that extends from an upstream end of the duct 2 and terminates at a position spaced from the downstream end of the duct 2, and a second partition 80b that starts from a position spaced from the upstream end of the duct 2 and terminates at the downstream end of the duct 2. The first and second partition walls 82a and 82b are in a vertically spaced relationship. A first air passageway 6 is formed below the partition wall 82b, and the second air passageway 7 is formed above the partition wall 82a. The third passageway 78 extends from the portion where the upper partition wall 83a terminates and the lower partition wall 82b starts in the direction of the flow of the air in the duct. The first inner heat exchanger 86 extends partly out of the partition 42b, and the second inner heat exchanger 87 located upstream from the first inner heat exchanger 87 extends vertically beyond the first partition wall 82a up to the second partition wall 82b. As a result, similar to the 1st to 6th embodiments, the recirculated air from the cabin (inside air from the inside air inlet 8) caused by the rotation of the first fan 3 passes through the first air passageway 6 and a lower part of the first inner heat exchanger 86 as shown by an arrow x. Contrary to this, the outside fresh air flow from the outside inlet 11 caused by the rotation of the second fan 4 passes through the second air passageway 7 and an upper part of the second inner heat exchanger 87 as shown by an arrow y. The air flowing through the third passageway 78, which is a combination of the inside and outside air, as shown by arrows z can pass through the lower part of the second inner heat exchanger 87 and then through the upper part of the first inner heat exchanger 86. A cool damper 84 is arranged in a by-pass passageway 84-1 formed in the duct 2 between the inner wall thereof and the upper end of the first inner heat exchanger 86, so that the door 84 is rotated between a position 84A as shown by a solid line for blocking the flow of air and a position 84B as shown by a dotted line for allowing the flow of air. A switching door 85 is provided for switching between a position to open the outside inlet 11 and a position to open the inside air inlet 8-1.

In the 7th embodiment in FIG. 8, extending from the downstream end of the duct 2 is a duct 22 extending to defroster outlets 12, a duct 18-1 extending to center, upper outlets 9-1 for creating air flows directed to the upper half of the passenger, a duct 18-2 extending to the side, upper outlets 9-2 for creating air flows directed to the upper half part of the passenger or side windows of the vehicle, and a duct 20 extending to the lower outlets 10 for creating air flows directed to leg portions of the passenger. A damper 90 is for opening or closing the air flow to the upper outlet duct 18-1 connected to the center upper outlets 9-1. A damper 91 is for opening or closing the duct 22 to the defroster outlets 12. A damper 92 is for opening or closing the duct 20 to the lower outlets 10. An opening 93 is formed in the partition wall 82b, which is open or closed by a damper 94.

Figure 9:
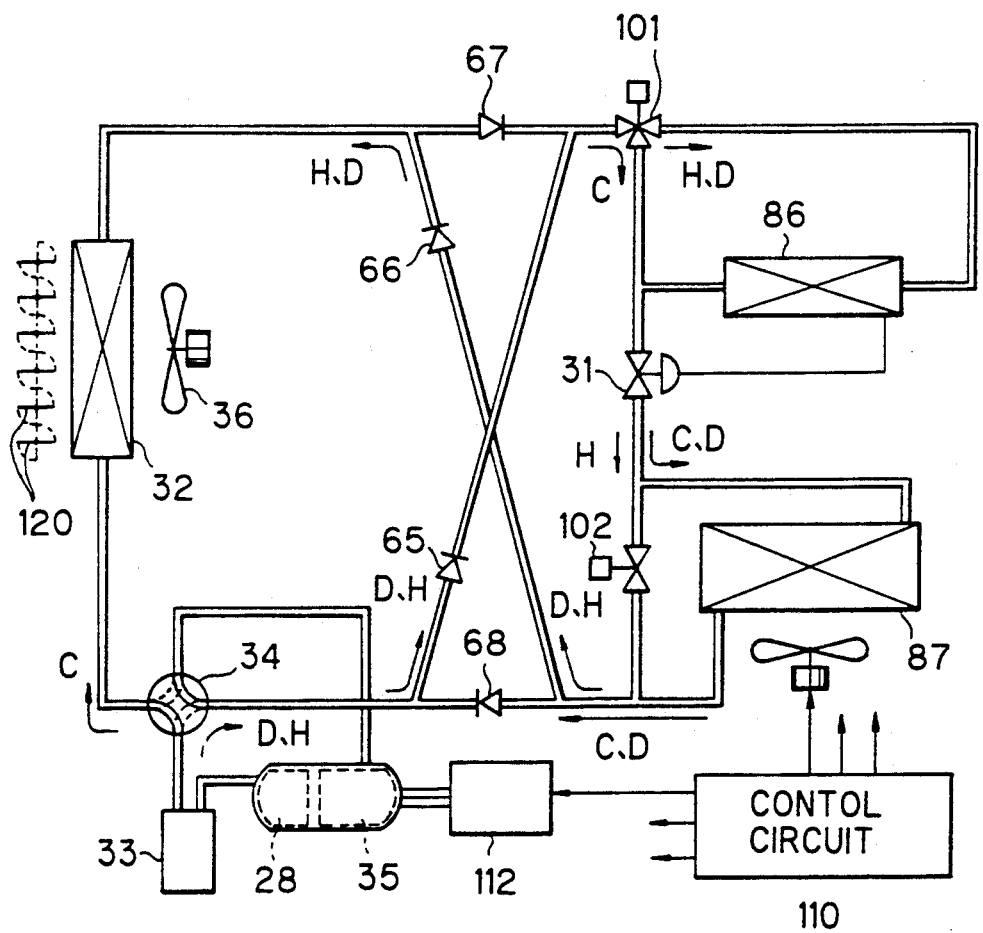
FIG. 9 shows a refrigerating circuit in FIG. 8.

FIG. 9 is an arrangement of a refrigerating cycle which is more or less similar to the arrangement in the sixth embodiment in FIG. 7. Namely, a four port two position switching valve 34, and a network constructed by the check valves 65, 66, 67 and 68 are provided. Together with the valves 34, 65, 66, 67 and 68, electromagnetic valves 101 and 102 are provided for switching the flow of refrigerant between a direction as shown by arrows H for obtaining a heating operation, a direction as shown by arrows D for obtaining a dehumidifying operation, and a direction as shown by arrows C for obtaining a cooling operation. The reduced pressure 31 is of a variable orifice type.

During a cooling operation, a recirculated flow of refrigerant from the compressor 28 as shown by the arrows C is obtained, in order, at the switching valve 34, the outside heat exchanger 32, the check valve 67, the electromagnetic valve 101, the pressure reducer 31, the second inner heat exchanger 87, the check valve 68, the switching valve 34, and the accumulator 33. Namely, during the cooling operation, the first inner heat exchanger 86 is by-passed.

During a heating operation, a recirculated flow of refrigerant from the compressor 28 as shown by the arrows H is obtained, in order, at the switching valve 34, the check valve 65, the electromagnetic valve 101, the first inner heat exchanger 86, the pressure reducer 31, the electromagnetic valve 102, the check valve 66, the outside heat exchanger 32, the switching valve 34, and the accumulator 33. Namely, during the heating operation, the second inner heat exchanger 87 is by-passed.

During a dehumidifying operation, a recirculated flow of refrigerant from the compressor 28 as shown by the arrows D is obtained, in order, at the switching valve 34, the check valve 65, the electromagnetic valve 101, the first inner heat exchanger 86, the pressure reducer 31, the second inner heat exchanger 87, the check valve 66, the outside heat exchanger 32, the switching valve 34, and the accumulator 33. Namely, during the dehumidifying operation, the refrigerant passes both the inner and second heat exchangers 86 and 87.

In FIG. 9, a control circuit 100 is shown for producing a signal directed to an inverter 112 for controlling the rotational speed of the electric motor 35 for rotating the compressor 28. In FIGS. 1 and 3 to 7, these control circuits 100 and inverters 112 are not shown for simplification thereof.

In FIG. 9, a reference numeral 120 shows a shutter for controlling a flow of outside air to the outside heat exchanger 38.

Figure 10:
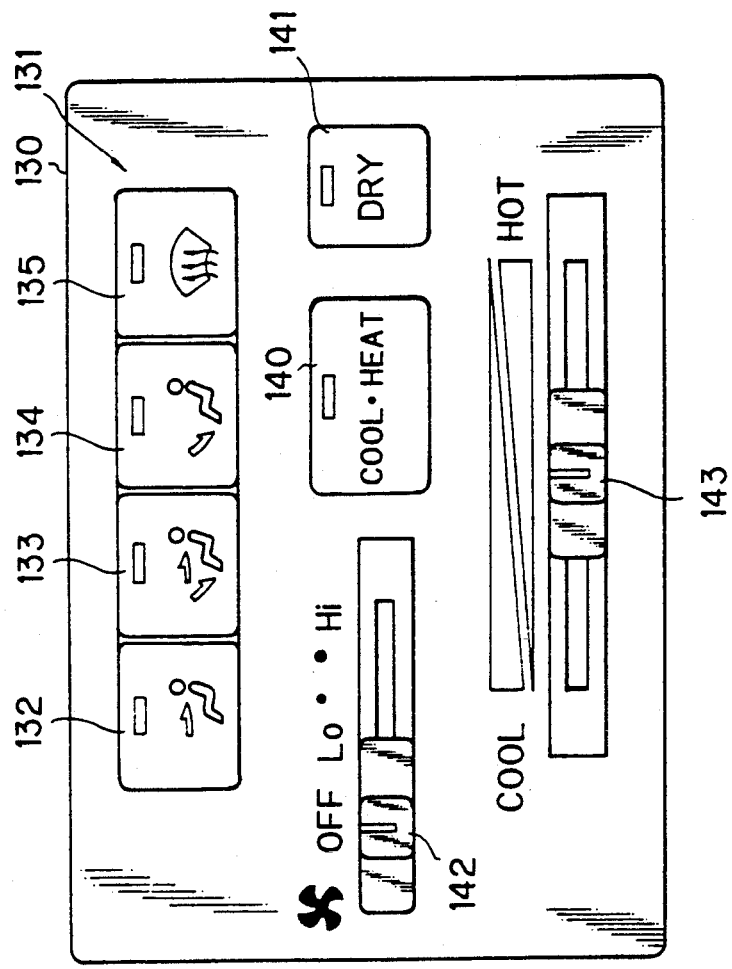
FIG. 10 shows an arrangement of an operating panel of the embodiment in FIG. 8.

FIG. 10 is an illustration of an operating panel 130 of the air conditioning apparatus in the seventh embodiment in FIGS. 8 and 9. The operating panel 130 is arranged in a suitable location in the cabin, and has a mode selector 131 including an upper outlet mode (face mode) switch 132, a by-level mode switch 133, a lower outlet mode (foot mode) switch 134, and a defroster mode switch 135. The operating panel 130 is also provided with a heat-cool switch 140 for obtaining a switching between a cooling operation and an heating operation, and a dehumidifying (drying) switch 141 for a dehumidifying operation. Mounted also on the control panel 130 are an air amount control lever 142 for controlling the rotational speed of the fans 3 and 4 for controlling the amount of air issued from the outlets as selected, and a temperature control lever 143 for controlling the rotational speed of the electric motor 35 for controlling the amount of refrigerant issued from the compressor 28 for controlling the temperature of the air issued into the cabin from the outlets as selected.

The operation of the seventh embodiment in FIGS. 8 to 10 will, now, be explained.

Cooling Operation Under Upper Outlet Mode

This mode (cooling operation under the upper outlet mode (face mode)) is shown in FIG. 11-(a). A passenger pushes the upper outlet mode switch 132 and the cooling-heating switch 140 on the panel 130, and the air amount control lever 142 is moved to a desired position from an OFF position, while the temperature control lever 143 is moved to the cooling side, which causes the refrigerating cycle to start a cooling operation where the refrigerant flows as shown by the arrows C in FIG. 9, and causes the damper 85 to be moved to the position to close the outside air inlet 11, so that the rotation of both the first and second fans 3 and 4 causes the inside air to be drawn introduced into the duct 2. The inside air drawn by the second fan 4, at the full amount, is in contact with the second inner heat exchanger 87 operating as an evaporator for cooling the air. Due to the closed position of the lower outlet control door 92 and the defroster control door 94, the inner air drawn by the first fan 3, also at the full amount, is directed to the second inner heat exchanger 87 to contact therewith and be cooled. In this mode, the cool damper 84 is in its fully open position, the upper outlet control door 90 is opened, and the defroster door 90 is fully closed. As a result, the air passes through the second and third passageways 7 and 78 (FIG. 8) to create air flows as shown by arrows y and y, which contact only with the second heat exchanger 87 and an air flow z, which contact both the second and first inner heat exchangers 87 and 86, so that the cooled air is directed to the ducts 18-1 and 18-2 to obtain a cooled air flow directed to the upper half part of the passenger from the center upper outlets 9-1 and right and left upper outlets 9-2. It should be noted that, although the second inner heat exchanger 86, at its upper portion, is in contact with the air flow y', no heat exchange operation takes place thereat due to the by-passing of the refrigerant flow as shown by the arrow C in FIG. 9. Finally, the temperature control lever 143 is controlled in its position to control the rotational speed of the compressor 28 and obtain a desired temperature of the air as issued from the upper outlets 9-1 and 9-2 in a range between 3° C to 15° C., as shown by a diagram A1 in FIG. 4-(b).

Dehumidifying Operation Under Upper Outlet Mode

This mode (dehumidifying operation under the upper outlet mode (face mode)) is shown in FIG. 11-(c). In the cooling mode, the dehumidifying switch 141 is further turned ON, causing refrigerant flows as shown by the arrows D in FIG. 8, where the first inner heat exchanger 86 operates as a condenser and the second inner exchanger 87 and the outside heat exchanger operate as evaporators. In this mode, the control circuit 110 moves the inlet switching door 85 to the position opening the outside inlet 11, while the cool damper 84 is moved to the closed position 84A as shown in FIG. 8. As a result, the rotation of the second fan 4 causes the outside air to be drawn from the outside air inlet 11 and to be directed to the second inner heat exchanger 87 operating as an evaporator, where the air is cooled and dehumidified. Due to the closed position of the lower outlet control door 92 and the defroster mode door 94, the inside air drawn by the first fan 3, at the full amount, contacts the lower part of the second inner heat exchanger 87, thereby causing the air to be cooled and dehumidified. The closed position 84A of the cool damper 84 causes all of the air flow from the second inner heat exchanger 87 to be directed to the upper portion of the first inner heat exchanger 86. In other words, only a third air flow as shown by the arrow z is created where the air flow contacts both the second and first inner heat exchangers 87 and 86. In this case, as already explained, the second heat exchanger 87 operates as the evaporator for cooling and dehumidifying the air, and the first inner heat exchanger 86 operates as the condenser for heating the dehumidified air from the first inner heat exchanger 87. As a result, the dried hot air is directed to the ducts 18-1 and 18-2 and is discharged toward the upper half part of the passenger from the center upper outlets 9-1 and side upper outlets 9-2. It should be noted that the temperature control lever 143 is controlled in its position to control the rotational speed of the compressor 28 and obtain a desired temperature of the air as issued from the upper outlets 9-1 and 9-2 in a range between 10° C. to 30° C., as shown by a diagram A2 in FIG. 11-(b).

Dehumidify Operation Under Bi-Level Mode

This operation (dehumidifying operation under the bi-level mode) is shown in FIG. 11-(d). In this mode, from the condition in FIG. 11(c), the lower opening control door 92 is opened so that the first air flow x contacting only the first heat exchanger 86 and the third air flow z contacting both the second and first inner heat exchanger 87 and 86 are created. Namely, the inside air drawn by the rotation of the first fan 3 is partly directed to the passageway 6, as shown by the arrow x, to contact with the lower part of the first inner heat exchanger 86, which functions as a condenser to heat the air and is directed to the duct 20 and to lower outlets 10, so that hot air is discharged to the lower half part of the passenger.

The remaining inner air from the first fan 3 and all of the air drawn by the second fan 4 are directed to the second inner heat exchanger 87 operating as an evaporator via the passageways 78 and the 7, respectively, so that the air is cooled and dehumidified. The dehumidified air is, as shown by the arrow z, directed to the upper part of the second inner heat exchanger 86 so that the air is heated thereat, and is directed to the ducts 18-1 and 18-2, so that the hot air is discharged from the center upper outlets 9-1 and right and left upper outlets 9-2 toward the upper half part of the passenger. It should be noted that the temperature control lever 143 is controlled in its position to control the rotational speed of the compressor 28 and obtain a desired temperature of the air as issued from the upper outlets 9-1 and 9-2 in a range between 15° C. to 30° C., as shown by a diagram B1 in FIG. 11-(e), and a desired temperature of the air as issued from the lower outlets 10 in a range between 30° C. to 45° C., as shown by a diagram B2 in FIG. 11-(e).

A ratio of the amount of air contacting the upper section of the heat exchanger 86 projected out of the partition wall to the amount of air contacting the lower section of the heat exchanger 86 in the first air passageway is about ½. Furthermore, the difference in temperature between the inside air brought into contact with the lower part of the first inner heat exchanger 86 as a heater and the temperature of the air just after the second inner heat exchanger 87 is about 20° C., so that a difference in temperature of the air discharged from the lower outlets 10 and that from the upper outlets 9-1 and 9-2 is about 15° C. wherein the fully closed position of the cool damper 84.

In this mode, instead of maintaining the fully closed position 84A of the cool damper 84, it may be opened to a desired degree, which causes the temperature difference to increase between the air issued from the lower outlet 10 and the air issued from the upper outlets 9-1 and 9-2.

Heating Operation Under Bi-Level Mode

Under the bi-level mode in FIG. 11-(d), the dehumidifying (dry) switch 141 is turned OFF, so that the refrigerant cycle is controlled so that the flow of refrigerant as shown by the arrow H in FIG. 9 is obtained. Namely, the electromagnetic valve 102 is opened, causing the refrigerant to by-pass the second inner heat exchanger 87. Thus, only the first inner heat exchanger 86 as a condenser actively heats the inside air from the inside air inlet 8 and the outside air from the outside air inlet 11. Thus, hot air is issued not only from the lower outlets 10 but also from the upper outlets 9-1 and 9-2.

Dehumidifying Operation Under Lower Outlet Mode

As shown in FIG. 11-(f), the lower outlet control door 92 is opened for obtaining air flows from the lower air outlets 10 and the upper outlet control door 90 is closed, and the dehumidifying switch 141 is turned ON thereby causing the refrigerating circuit to create a flow of refrigerant as shown by the arrow D, and thereby causing the first inner heat exchanger 86 to operate as a condenser (heater) and the second inner heat exchanger 87 to operate as an evaporator (cooler). Due to the opened position of the lower outlet control door 92, the first air flow is created and a hot air flow from the inside air inlet 8 as shown by the arrow x and directed to the lower outlet 10 is obtained. Furthermore, the cool damper 84 is moved to a fully closed position, so that the remaining inside air from the inside air inlet 8 and all of the outside air from the outside air inlet 11 are in contact with the second inner heat exchanger 87 as the cooler and the first inner heat exchanger 86 as a heater to provide the third flow passageway of dehumidifying air, as shown by the arrow z, which is directed to the upper right and left outlets 9-2. Furthermore, the defroster door 91 is opened so that the dehumidifying hot air is also directed to the duct 22 in FIG. 8, and is discharged from the defroster outlets 12 toward the lower part of the windshield (not shown).

Temperature control lever 143 is controlled so as to control the rotational speed of the compressor 28 and obtain a desired air temperature as issued from the upper side 9-2 and the defroster outlets 12 in ranges between 25° C. to 45° C., as shown by diagrams C2 and C1, and a desired air temperature as issued from the lower outlets 10 in a range between 30° C. to 50° C., as shown by a diagram C3 in FIG. 11-(g).

Heating operation Under Lower Outlet Mode

In the lower outlet mode in FIG. 11-(f), the dehumidifying switch 141 is turned OFF, thereby controlling the refrigerant cycle and obtaining the flow of refrigerant as shown by the arrow H in FIG. 9. Thus, only the first inner heat exchanger 86 acting as a condenser actively heats the inside air. Thus, the hot air after being heated by the first inner heat exchanger 86 is not only directed to the lower outlet, 10 as shown by the arrow x, but is also directed, as shown by the arrow z, to the upper right and left outlet 9-2 toward the upper part of the passenger and the defroster outlet 12 toward the lower part of the windshield. In this case, it is possible to de-frost the windshield very effectively, due to the fact that the air discharged from the right and left upper outlets 9-2 is based partly on air introduced from the outside air inlet 11, which can reduce the possibility of the windshield from clouding. Such de-clouding operation during a heating operation will be described in more detail, at a later time.

Dehumidifying Operation Under Defroster Mode

As shown in FIG. 11-(h), the lower outlet control door 92 is closed, the defroster control door 94 is opened, the upper outlet control door 90 is closed, and the defroster door 91 is opened. The dehumidifying switch 141 is turned ON so as to cause the refrigerating circuit to create a flow of refrigerant as shown by the arrow D, thereby causing the first inner heat exchanger 86 to operate as a condenser (heater) and the second inner heat exchanger 87 to operate as an evaporator (cooler). Due to the opened position of the defroster control 94, the first passageway is created to obtain and direct an hot air flow from the inside air inlet 8, as shown by the arrow x, to the passageway 93 in FIG. 8. Furthermore, the cool damper 84 is moved to a fully closed position, so that the remaining inside air from the inside air inlet 8 and the outside air from the outside air inlet 11 is in contact with the second inner heat exchanger 87 acting as the cooler and the first heat exchanger 86 acting as a heater. The hot air from the connection passageway 93, as shown by the arrow x, and the hot air from the upper part of the inner heat exchanger 86, as shown by the arrow z, are combined, and directed to the upper right and left outlets 9-2 via the duct 18-2 and the defroster outlet 12 via the duct 22.

Temperature control lever 143 is controlled so as to control the rotational speed of the compressor 28 and obtain a desired air temperature as issued from the right and left upper outlets 9-2 and the defroster outlet 12 in ranges between 30° C. to 50° C., as shown by diagrams D1 and D2 in FIG. 11-(i).

Heating Operation Under Defroster Mode

In the lower outlet mode in FIG. 11-(h), the dehumidifying switch 141 is turned OFF, so that the refrigerant cycle is controlled and the flow of refrigerant, as shown by the arrow H in FIG. 9, is obtained. Thus, only the first inner heat exchanger 86 acting as a condenser actively heats the inside air. Thus, the hot air after being heated by the lower part of the first inner heat exchanger 86, as shown by the arrow x, and the hot air after heated by the upper part of the inner heat exchanger 86, as shown by the arrow z are combined and directed to the upper right and left outlet 9-2 and the defroster outlet 12 toward the lower part of the windshield.

Now, the above mentioned de-clouding operation during the heating operation in the lower outlet mode (FIG. 11-(f)) will be explained with reference to FIGS. 12-(A) to (C), while being compared with the prior art, where the outside air is heated or outside air and inside air are mixed. First, during an heating operation at the upper outlet mode, the case when 100% outside air used and the case when an amount of inside air and an amount of outside air are mixed are explained. The test conditions are such that the outside air temperature is 0° C., the relative humidity of the outside air is 90 to 95%, the number of the passengers is five, and the average temperature of the cabin is maintained at 25° C. (by contacting the air with the first inner heat exchanger 86 while by-passing the second inner heat exchanger 87 in FIG. 9).

In FIG. 12, which schematically shows a plan view of the cabin, reference numeral 150 is a front window shield, 151 is a front side window, 152 is a rear side window, and 153 is the back window.

In the case when 100% outside air is used, as shown in FIG. 12-(A), all of the windows 150 to 153 are not clouded if the amount of air discharged in 160 m$^3$/h, wherein the amount of air from the lower outlet 10 is 100 m$^3$/h at a temperature of 48° C., the amount of the air from the upper side outlets 9-2 is 40 m$^3$/h at a temperature of 38° C., and the amount of the air from the defroster outlets 12 is 20 m$^3$/h at a temperature of 40° C. The % value of relative humidity at respective regions of the windows 150 to 153 are shown in FIG. 12-(A). However, 100% use of outside air is defective in that the heating load for the air conditioning system is high because it is necessary to increase the low temperature outside air.

In the case when the inside air and the outside air are mixed, if the ratio of the inside air to the total amount of air is 90%, the total area of the front window 150 and part of the rear side window 152 are clouded as shown in FIG. 12-(B) due to high relative humidity at respective areas near the windows. In this case, the total amount of air issued is 160 m$^3$/h, in the lower outlet mode, wherein the amount of air from the lower outlet is 100 m$^3$/h at a temperature of 48° C., the amount of air from the upper side outlets is 40 m$^3$/h at a temperature of 27° C., and the amount of air from the defroster outlets is 20 m$^3$/h at a temperature of 36° C. As can be easily understood, although mixing the outside air and the inside air can reduce the load of the air conditioning apparatus to a value below 60% over the case if 100% of the outside air is used, the windows are still clouded.

Then, according to the present invention, the foot mode in FIG. 11-(f) is assumed, wherein the outside air is mainly discharged to the upper part of the passengers, and the inside air is directed to the lower part of the passenger. In this case, the total amount of air issued is 190 m$^3$/h, wherein the amount of air from the lower outlet 10 is 120 m$^3$/h at a temperature of 51° C., the amount of air from the upper side outlets 9-2 is 45 m$^3$/h at a temperature of 31° C., and the amount of air from the defroster outlets 12 is 25 m$^3$/h at a temperature of 34° C. As can be easily seen from FIG. 12-(C), the value of relative humidity at regions near respective windows 150 to 153 is improved to substantially the same level as the case when 100% of the outside air is used, as in FIG. 12-(A), which can prevent the windows from clouding, except for small regions on the rear side windows 152, while reducing the electric power that the air conditioning apparatus consumes.

The heating operation in the lower outlet (foot) mode is effective for minimizing the occurrence of condensation on the windows. However, when condensation occurs or a passenger feels it is necessary, switching from the heating operation during the dehumidifying operation in the foot mode very effectively de-clouds the windows or obtains a desired humidity in the cabin around the upper part of the passenger, thereby obtaining a power effective heating operation.

FIG. 13 is an 8th embodiment that is modified over the embodiment in FIG. 8 in that the first and second fans 3 and 4 are connected to the same electric motor 160.

FIG. 14 is a 9th embodiment that is modified over the embodiment in FIG. 8 in that a fan 170, which is common to the first and second passageways 6 and 7, is provided.

In the embodiments in FIGS. 8 to 14, the air conditioning apparatus can also be embodied in a car provided with an internal combustion engine, in particular, a diesel engine. In place of the heat exchanger 86, an electric heater, a hot water type heater, or a combustion heater can be employed to heat the air. A switching door can be provided in the inside air inlet 8 so that the outside air is directed to the lower outlet toward the leg portion of the passenger.

FIG. 15 shows a construction of a 10th embodiment that is similar to FIG. 8, except that the upstream heat exchanger 87 extends across the entire width of the duct 2. Namely, the duct 2 is divided by the partition 82b into a first layer 180 located above the partition 82b and the second layer 182 located below the partition 82b. The outside air from the inside air inlet 8 and a part of the inside air from the inlet 8 are introduced into the first layer 180 so that the air contacts both upper parts of the heat exchangers 87 and 86. The remaining inside air from the inside air inlet 8 is directed to the second layer 182 so as to contact the lower parts of the heat exchangers 87 and 86. A cool damper 84 is arranged in the first layer 182 for controlling the amount of air in a by-pass passageway 84-1 by-passing the upper part of the heat exchanger 86.

FIG. 16 shows diagrams in respective operation modes in the 10th embodiment. FIG. 16 is similar to FIG. 11, and therefore its explanation is forcused to points which are different from FIG. 11.

During a cooling operation in the upper outlet mode (so-called face mode), the refrigerant by-passes the first inner heat exchanger 86 (FIG. 9) acting as a cooler. The cool door 84 is fully opened and the defroster control door 90 is fully opened although the defroster door 91 is fully closed. The switching door 85 opens the inside air inlet 8-1. As a result, the inside air from the inlet 8 is, via the second layer 182, directed to the lower part of the upstream heat exchanger 87 acting as a cooler and the lower part of the heat exchanger 86 (not operated). The remaining inside air from the inlets 8 and 8-1 are, via the first layer 180, directed to the upper parts of the second inner heat exchanger 87 acting as a cooler and to the by-pass passageway 84-1 thereby by-passing the heat exchanger 86 acting as a heater or the upper section of the downstream heat exchanger 86. The cooled air passing through the second layer 182 passes through the communication passageway 93, and is combined with air from the first layer 180 (the by-pass passageway 84-1 or upper section of the upstream heat exchanger 87), and is discharged from the upper center outlets 9-1 and upper right and left outlets 9-2. The temperature range as obtained is shown by A1.

During a dehumidifying operation in an upper outlet mode (FIG. 16-(c)), the cool door 84 fully closes the by-pass passageway 84-1, and the defroster control door 94 is fully opened. The switching door opens the outside air inlet 11. In the first layer 180, the outside air from the outside air inlet 11 and a part of the inside air from the inside air inlet 8 pass through the upper section of the second inner heat exchanger 87 acting as a cooler and then to the upper section of the downstream heat exchanger 86 acting as a heater. In the second layer 182, the remaining part of inside air from the inside air inlet 8 passes through the lower section of the upstream heat exchanger 87 acting as a cooler and the lower section of the first inner heat exchanger 86 acting as a heater, passes through the communication passageway 93, is combined with air from the first layer 180, and is discharged from the upper center outlets 9-1 and upper right and left outlets 9-2. The temperature range is shown by A2 in FIG. 16-(b).

In the by-level mode, as shown in FIG. 16-(d), the cool door 84 is closed, so that, in the first layer 180, the outside air from the outside air inlet 11 and a part of the inner air pass through the upper sections of the heat exchangers 87 and 86, and are then directed to the upper outlets 9-1 and 9-2. The remaining inside air from the inside air inlet 8 is, via the second layer 182, i.e., the lower sections of the heat exchangers 87 and 86, directed to the lower outlet 10. In this bi-level mode, depending on the dehumidifying switch position, the upstream heat exchanger 87 operates as a cooler and the down stream heat exchanger 86 operates as a heater. The temperature range of the air from the upper outlets 9-1 and 9-2 is as shown by B1, and the temperature range of the air from the lower outlets 10 is as shown by B2. The cool door 84 can be moved so as to control the amount of air directed to the by-pass passageway 84-1, i.e., the amount of cool air by-passing the heater 86.

In the lower outlet mode (so-called foot mode in FIG. 16-(f)), the cool damper 84 closes the by-pass passageway 84-1, the defroster door 91 is opened, and the defroster control door 84 is closed. In the first layer 180, the air, including the outside air, is, via the upper parts of the heat exchangers 87 and 86, directed to the upper right and left outlets 9-2 and the defroster outlet 12. In the second layer 182, 100% of the inside air is, via the lower sections of the heat exchangers 87 and 86, directed to the lower openings 10. The temperature range of the air at the defroster outlets 12, the right and left upper outlets 9-2 and the lower outlets 10 is shown by C1, C2 and C3, respectively.

In defroster mode in FIG. 16-(n), the defroster control door 94 is open, the lower outlet door 92 is closed, the upper outlet control door 90 is closed, and the defroster door 91 is opened. Thus, the flow in the first layer 180 and the flow in the second layer 182 is combined via the passageway 93, and is directed to the upper right and left outlets 9-2 and the defroster outlets 12. The temperature range at the outlets 9-2 and the defroster outlets 12 is indicated by D1 and D2, respectively.

FIGS. 17 and 18 correspond to FIG. 13, except that the first and second layers 180 and 182 are provided. Namely, the first fan 3 and second fan 4 are connected to a common electric motor 160. FIG. 18 illustrates how the air conditioning apparatus in FIG. 17 is arranged in the cabin. The location of the center upper outlets 9-1 and the right and left upper outlets 9-2 will be clarified.

FIG. 19 corresponds to FIG. 14, except that the first and second layers 180 and 182 are provided. Namely, the same fan 170 is used for obtaining an air flow in the first and the second layers 180 and 182.

FIG. 20 is another embodiment where the position of the first layers 180 and 182 are reversed. Namely, the first layer 180, in which out side air is "rich", is located on the lower, while the second layer 182, in which the inside air is "rich", is located on the upper. A single fan 200 is provided for obtaining a first air flow, including the major amount of outside air directed to a first passageway 202, directed to the first layer 180, and a second air flow, including the major amount of inside air directed to the second passageway 204, directed to the second layer 182. As shown in FIG. 21, the fan device 200 is provided with an axial inlet 209 that is divided into an inside air inlet 210 as a lower half of the port always opened as an inner air inlet, and an outside air inlet 212 as an upper half of the port directed to the outside air inlet 11 when the valve closes the inside air inlet 8-1. The fan device has a scroll outlet having a guide plate 214 such that the air drawn at the outside air inlet 212 is introduced mainly into the first passageway 202 directed to the first section 180, and the air drawn at the inside air inlet 210 is introduced mainly into the first passageway 204 directed to the second section 182. As shown in FIGS. 22 and 23, the guide plate 216 is provided with a V-shaped cut out portion that extends from a downstream end to a middle portion thereof in the circumferential direction of the fan. The cut out portion 216 is effective for suppressing noise, and for obtaining an effective separation of the inside and outside air flows.

In the embodiments in FIGS. 15 to 23, the air conditioning apparatus can also be embodied in a car provided with an internal combustion engine, in particular, a diesel engine or a lean burn engine. In place of the heat exchanger 86, an electric heater, an hot water type heater, or a combustion heater can be employed to heat the air. A switching door can be provided in the inside air inlet 8 so that the outside air is directed to the lower outlet toward the lower portion of the passenger. Furthermore, the damper 85 and the inside air inlet can be eliminated thereby always introducing the outside air into the first layer 180.

We claim:

1. An air conditioning apparatus for a vehicle having a passenger cabin and a windshield, comprising
    an air duct having at an inlet side, an inside air inlet for introduction of air from the cabin and an outside air inlet for introduction of air from outside, and having at an outlet side, a defroster outlet for discharging a first air flow toward the windshield and a lower outlet for discharging a second air flow toward a lower portion of a passenger;
    means for forcing said flows of air in the duct;
    heat exchanging means arranged in the duct for obtaining a heat exchange between a refrigerant in the heat exchanging means and the air flows in the duct;
    compression means for obtaining a compressed flow of refrigerant; and
    means cooperating with said heat exchanging means and the compression means for constructing a refrigerating cycle so that a high temperature refrigerant is introduced into the heat exchanging means;
    said air duct being divided into a first air passageway for connecting the inside air inlet to the lower outlet and a second air passageway for connecting the outside air inlet to the defroster outlet;
    said heat exchanging means being divided into a first section contacting the air flow in the first air passageway and a second section contacting said second air flow in said second air passageway; and
    said second section being located downstream from the first section in the direction of the flow of the refrigerant in a refrigerant cycle;
    wherein the refrigerant from the first section is subjected to a heat exchange with the second air flow in the second air passageway.

2. An air conditioning apparatus according to claim 1, wherein
    said air duct division includes a partition wall dividing said first from said second air passageway; said partition having a communication opening between said first and second air passageways at a location down stream in the direction of the first and second air flows; and
    a communication passageway for selectively opening or closing said communication opening.

3. An air conditioning according to claim 1, wherein said first and second sections are each constructed as independent heat exchangers.

4. An air conditioning apparatus according to claim 2, wherein said first and second sections are constructed as a single heat exchanger extending via said partition wall.

5. An air conditioning apparatus according to claim 1, wherein it further comprises an additional heat exchanging means located downstream from the first heat exchanging means in the direction of the refrigerant; said second heat exchanging means having a first section in the first air passageway and a second section in the second air passageway; said additional heat exchanging means being arranged in series with respect to the first heat exchanging means in the direction of the air flow in the duct.

6. An air conditioning apparatus according to claim 1, further comprising a switching door arrange din the duct; said switching door being moved between a first position where the first passageway is connected to the inside air inlet and a second position where the first passageway is connected to the outside air inlet.

7. An air conditioning apparatus according to claim 1, wherein said means for forcing said flows of air comprise a first rotating fan arranged in the first passageway for generating an airflow therein, and a second rotating fan arranged in the second passageway for generating an airflow therein.

8. An air conditioning apparatus for a vehicle having a passenger cabin and a windshield, comprising
    an air duct having at an inlet side, an inside air inlet for introduction of air from the cabin and an outside air inlet for introduction of the air from the outside, and having at an outlet side, a defroster outlet for discharging a first air flow toward the windshield, a lower outlet for discharging a second air flow toward a lower part of a passenger, and an upper outlet for discharging a third air flow toward an upper part of the passenger;
    means for forcing said flows of air in the duct; and
    a circuit of refrigerant comprising:
    i) inside heat exchanging means arranged in the duct for obtaining a heat exchange between the refrigerant in the inside heat exchanging means and the air flows in the duct;
    ii) outside heat exchanging means arranged outside the duct for obtaining a heat exchange between the refrigerant in the outside heat exchanging m ans and outside air;
    iii) pressure reducing means for reducing a pressure of the refrigerant;
    iv) compression means for obtaining a compressed flow of the refrigerant, and;
    v) switching means for reversing a direction of flow of the refrigerant between a heater position, where the compressed refrigerant is introduced into the inside heat exchanging means, and a cooler position where the compressed refrigerant is introduced into the outside heat exchanging means;
    said air duct being divided into a first air passageway for connecting the inside air inlet to the lower outlet and a second air passageway for connecting the outside air inlet to the defroster outlet;

said inner heat exchanging means being divided into a first section contacting the first air flow in the first air passageway and a second section contacting said second air flow in said second air passageway; and said second section located in series with the first section in the direction of the flow of the refrigerant in a refrigerant cycle;

wherein the refrigerant from the first section is subjected to a heat exchange with the second air flow in the second air passageway;

wherein, upon switching said switching means into said heater position, the compressed refrigerant from the compressor is first introduced into the first section and then to the second section of the inside heat exchanging means and, after passing through the pressure reducing means, is introduced into the outside heat exchanging means for recirculation to the compression means; and wherein, upon switching said switching means into said cooler position, the compressed refrigerant from the compressor is first introduced into the outside heat exchanging means and, after passing through the pressure reducing means, is introduced into the second and then the first section of the inside heat exchanging means for recirculation to the compression means.

9. An air conditioning apparatus for a vehicle having a passenger cabin and a windshield, comprising
an air duct having at an inlet side, an inside air inlet for introduction of air from the cabin and an outside air inlet for introduction of air from outside, and having at an outlet side, a defroster outlet for discharging air toward the windshield, an upper outlet for discharging air toward an upper part of a passenger, and a lower outlet for discharging air toward a lower portion of the passenger;
means for forcing said air in the duct;
first heat exchanging means arranged in the duct for obtaining a heat exchange between a refrigerant and the air in the duct;
second heat exchanging means, arrange din the duct upstream of the first heat exchanging means in the direction of an air flow, for obtaining a heat exchange between the refrigerant and the air in the duct;
outside heat exchanging means for obtaining a heat exchange between the refrigerant and the outside air;
pressure reducing means for reducing the pressure of the refrigerant;
compression means for obtaining a compressed flow of the refrigerant, and;
refrigerant cycle means, cooperating with said first and second heat exchanging means, said outside heat exchanging means, the pressure reducing means, and the compression means, for circulating said refrigerant; said refrigerant cycle means having a heating operation, whereby the refrigerant is recirculated, in order, to the compression means, the first heat exchanging means, the pressure reducing means, and the outside heat exchanging means, so that the first heat exchanging means acts as a heater, and having a cooling operation, whereby the refrigerant is recirculated, in order, to the compression means, the outside heat exchanging means, the pressure reducing means, and the second heat exchanging means, so that the second heat exchanging means acts as a cooler, and having a dehumidifying operation, whereby the refrigerant is recirculated in order, to the compression means, the first inside heat exchanging means, the pressure reducing means, the second heat exchanging means, and the outside heat exchanging means, so that the first heat exchanging means acts as a heater and the second heat exchanging means acts as a cooler;
said air duct being divided into a first air passageway for connecting the inside air inlet to the lower outlet, a second air passageway for connecting the outside air inlet to the defroster and upper outlets, and a third passageway for connecting the inside air inlet to the defroster and upper outlets;
wherein the air flow through the first passageway contacts only the first heat exchanging means, the air flow through the second passageway contacts only the second heat exchanging means, and the air flow in the third passageway contacts both the first and the second heat exchanging means.

10. An air conditioning apparatus according to claim 9, further comprising valve means arranged in the second passageway for controlling a ratio of the amount of air in the second passageway over the amount of air in the third passageway.

11. An air conditioning apparatus for a vehicle having a passenger cabin and a windshield, comprising
an air duct having at an inlet side, an inside air inlet for introduction of air from the cabin and an outside air inlet for introduction of air from outside, and having at an outlet side, a defroster outlet for discharging air toward the windshield, an upper outlet for discharging air toward an upper part of a passenger, and a lower outlet for discharging air toward a lower portion of the passenger;
means for forcing said air in the duct;
first heat exchanging means arranged in the duct for obtaining a heat exchange between a refrigerant and the air in the duct;
second heat exchanging means, arranged in the duct upstream of the first heat exchanging means in the direction of an air flow, for obtaining a heat exchange between the refrigerant and the air in the duct;
outside heat exchanging means for obtaining a heat exchange between the refrigerant and the outside air;
pressure reducing means for reducing the pressure of the refrigerant;
compression means for obtaining a compressed flow of the refrigerant, and;
refrigerant cycle means, cooperating with said first and second heat exchanging means, the outside heat exchanging means, the pressure reducing means, and the compression means, for circulating said refrigerant; said refrigerant cycle means having a heating operation, whereby the refrigerant is recirculated, in order, to the compression means, the first heat exchanging means, the pressure reducing means, and the outside heat exchanging means, so that the first heat exchanging means acts as a heater, and having a cooling operation, whereby the refrigerant is recirculated, in order, to the compression means, the outside heat exchanging means, the pressure reducing means, and the second heat exchanging means, so that the second heat exchanging means acts as a cooler, and having a de-humidifying operation, whereby the refrigerant is recirculated, in order, to the compression means, the first inside heat exchanging means, the pressure reducing means, the second inner heat exchanging means, and the outside heat exchanging means, so that the first heat exchanging means acts as a heater and the second heat exchanging means acts as a cooler;

said air duct being divided into a first air flow layer for connecting the inside and outside air inlets with the defroster and upper outlets, and a second air flow layer for connecting the inside air inlet to the lower outlet; said valve means being arranged in the first layer for controlling the amount of the air by-passing the first heat exchanging means wherein in the first layer, all of the flowing air contacts the second heat exchanging means and then contacts or by-passes the first heat exchanging means; and wherein in the second layer, all of the flowing air contacts the second heat exchanging means, and then contacts the first heat exchanging means.

12. An air condition apparatus according to claim 11, wherein said means for generating forced flows comprises a blower having an axial inlet and circumferentially spaced radial outlets; said outside air inlet facing a part of the axial inlet; said outside air inlet facing a remaining part of the axial inlet, the duct having a separating member of dividing the flow generated by the blower into a first section directed to the first layer and a second section directed to the second layer; the arrangement of the axial inlet of the blower with respect to the inside air inlet and the outside air inlet being such that a majority of the outside air is directed to the first layer, and a majority of the inside air is directed to the second layer.

13. An air conditioning apparatus for a vehicle having a passenger cabin and a windshield, comprising an air duct having at an inlet side, an inside air inlet for introduction of air from the cabin and an outside air inlet for introduction of air from outside, and having at an outlet side, a defroster outlet for discharging air toward the windshield, an upper outlet for discharging air toward an upper part of a passenger, and a lower outlet for discharging air toward a lower portion of the passenger;

means for forcing said air in the duct;

cooling means arranged in the duct for cooling air contacted therewith;

heat exchanger means arranged in the duct downstream from the cooling means, for heating air contacted therewith, a heating capacity of the heat exchanger means being variable;

a by-pass passageway bypassing the heat exchanger means;

a cool damper arranged in the by-pass passageway controlling an amount of air by-passing;

said duct being divided into a first layer having input the outside air, which after contacting the cooling means, is directed to the by-pass passageway and the heat exchanger means, and a second layer having input the inside air, which is passed to both the cooling means and the heat exchanger means;

said first layer being directed to the upper outlet and the defroster outlet, and the second layer being directed to the lower outlet.

* * * * *